(12) United States Patent  (10) Patent No.: US 8,337,304 B2
Yoshino et al.  (45) Date of Patent: Dec. 25, 2012

(54) GAME CONSOLE

(75) Inventors: Hiroshi Yoshino, Kyoto (JP); Keizo Ohta, Kyoto (JP); Yoshitaka Yasumoto, Kyoto (JP); Kenji Nishida, Kyoto (JP); Kenichi Sugino, Kyoto (JP); Masato Ibuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 74 days.

(21) Appl. No.: 12/461,534

(22) Filed: Aug. 14, 2009

(65) Prior Publication Data

US 2009/0305783 A1  Dec. 10, 2009

Related U.S. Application Data

(60) Division of application No. 11/111,985, filed on Apr. 22, 2005, which is a continuation-in-part of application No. 10/921,957, filed on Aug. 20, 2004, now Pat. No. 7,786,997.

(30) Foreign Application Priority Data

Mar. 31, 2004  (JP) ................................ 2004-106874

(51) Int. Cl.
*A63F 9/24* (2006.01)
(52) U.S. Cl. ................................ 463/32; 463/34; 463/30
(58) Field of Classification Search ................ 463/32, 463/30, 34
See application file for complete search history.

(56) References Cited

U.S. PATENT DOCUMENTS

| | | | |
|---|---|---|---|
| 4,204,728 A | 5/1980 | Goshima et al. |
| 4,384,326 A | 5/1983 | Devchoudhury |
| 4,432,067 A | 2/1984 | Nielsen |
| 4,481,529 A | 11/1984 | Kerling |
| 4,516,777 A | 5/1985 | Nikora |
| 4,542,903 A | 9/1985 | Yokoi et al. |
| 4,628,304 A | 12/1986 | Bottiau |
| 4,703,318 A | 10/1987 | Haggerty |
| 4,811,205 A | 3/1989 | Normington et al. |
| 4,865,321 A | 9/1989 | Nakagawa et al. |
| 4,922,420 A | 5/1990 | Nakagawa et al. |
| 4,924,413 A | 5/1990 | Suwannukul |
| 4,931,860 A | 6/1990 | Narumiya |
| 4,977,398 A | 12/1990 | Pleva et al. |
| 4,979,738 A | 12/1990 | Frederiksen |

(Continued)

FOREIGN PATENT DOCUMENTS

EP  0 850 672  1/1998

(Continued)

OTHER PUBLICATIONS

PC World, Sony, Nintendo Unveil Game Handhelds, Tom Mainelli, PC World, May 11, 2004, printed from http://www.pcworld.com/resource/printable/article/0,aid,116101,00.asp on Sep. 16, 2004 (3 pages).

(Continued)

*Primary Examiner* — Pierre E Elisca
(74) *Attorney, Agent, or Firm* — Nixon & Vanderhye P.C.

(57) ABSTRACT

An example portable, handheld game console includes a main body incorporating a first display screen, and a cover body incorporating a second display screen. The main body is hingedly connected to the cover body along adjacent forward and rearward edges, respectively, such that the cover body is movable between closed and open positions. The main body is provided with a plurality of control buttons and a pair of game card slots for receiving game cards of different dimensions.

39 Claims, 17 Drawing Sheets

U.S. PATENT DOCUMENTS

| | | | |
|---|---|---|---|
| 4,981,296 A | 1/1991 | Shiraishi et al. | |
| 4,984,193 A | 1/1991 | Nakagawa | |
| 5,023,603 A | 6/1991 | Wakimoto et al. | |
| 5,095,798 A | 3/1992 | Okada et al. | |
| 5,109,504 A | 4/1992 | Littleton | |
| 5,112,051 A | 5/1992 | Darling et al. | |
| 5,134,391 A | 7/1992 | Okada | |
| 5,155,380 A | 10/1992 | Hwang et al. | |
| 5,161,803 A | 11/1992 | Ohara | |
| 5,166,666 A | 11/1992 | Tanaka | |
| 5,184,830 A | 2/1993 | Okada et al. | |
| 5,207,426 A | 5/1993 | Inoue et al. | |
| 5,238,250 A | 8/1993 | Leung et al. | |
| 5,245,327 A | 9/1993 | Pleva et al. | |
| 5,265,888 A | 11/1993 | Yamamoto et al. | |
| 5,276,785 A | 1/1994 | Mackinlay et al. | |
| 5,300,944 A | 4/1994 | Shapiro et al. | |
| 5,321,811 A | 6/1994 | Kato et al. | |
| 5,327,158 A | 7/1994 | Takahashi et al. | |
| 5,371,512 A | 12/1994 | Otake et al. | |
| 5,395,112 A | 3/1995 | Darling | |
| 5,400,053 A | 3/1995 | Johary et al. | |
| 5,412,800 A | 5/1995 | Bril et al. | |
| 5,422,375 A | 6/1995 | Rytter et al. | |
| 5,453,763 A | 9/1995 | Nakagawa et al. | |
| 5,467,102 A | 11/1995 | Kuno et al. | |
| 5,495,266 A | 2/1996 | Otake et al. | |
| 5,509,663 A | 4/1996 | Otake et al. | |
| 5,552,799 A | 9/1996 | Hashiguchi | |
| 5,556,108 A | 9/1996 | Nagano et al. | |
| 5,559,954 A | 9/1996 | Sakoda et al. | |
| 5,592,651 A | 1/1997 | Rackman | |
| 5,603,064 A | 2/1997 | Bennett | |
| 5,608,424 A | 3/1997 | Takahashi et al. | |
| 5,617,546 A | 4/1997 | Shih et al. | |
| RE35,520 E | 5/1997 | Darling et al. | |
| 5,659,673 A | 8/1997 | Nonoshita | |
| 5,708,457 A | 1/1998 | Otake et al. | |
| 5,714,981 A | 2/1998 | Scott-Jackson et al. | |
| 5,759,104 A | 6/1998 | Shirae et al. | |
| 5,768,608 A | 6/1998 | Nakamura | |
| 5,770,533 A | 6/1998 | Franchi | |
| 5,785,598 A | 7/1998 | Hsu | |
| 5,790,096 A | 8/1998 | Hill, Jr. | |
| 5,793,351 A | 8/1998 | Leach | |
| 5,808,591 A | 9/1998 | Mantani | |
| 5,844,532 A | 12/1998 | Silverbrook et al. | |
| 5,854,620 A | 12/1998 | Mills et al. | |
| 5,892,939 A | 4/1999 | Call et al. | |
| 5,949,985 A | 9/1999 | Dahl et al. | |
| 5,954,808 A | 9/1999 | Paul | |
| 5,959,596 A | 9/1999 | McCarten et al. | |
| 6,020,751 A | 2/2000 | Rampone et al. | |
| 6,042,478 A | 3/2000 | Ng | |
| 6,047,373 A | 4/2000 | Hall et al. | |
| 6,052,794 A | 4/2000 | Polzin et al. | |
| 6,109,939 A | 8/2000 | Kondo et al. | |
| 6,115,054 A | 9/2000 | Giles | |
| 6,132,315 A | 10/2000 | Miyamoto et al. | |
| 6,170,743 B1 | 1/2001 | Okaue et al. | |
| 6,199,756 B1 | 3/2001 | Kondo et al. | |
| 6,200,216 B1 | 3/2001 | Peppel | |
| 6,209,043 B1 | 3/2001 | Sanemitsu | |
| 6,215,459 B1 | 4/2001 | Reddy et al. | |
| 6,243,654 B1 | 6/2001 | Johnson et al. | |
| 6,295,206 B1 | 9/2001 | Kondo et al. | |
| 6,297,945 B1 | 10/2001 | Yamamoto | |
| 6,311,246 B1 | 10/2001 | Wegner et al. | |
| 6,315,669 B1 | 11/2001 | Okada et al. | |
| 6,322,447 B1 | 11/2001 | Okada et al. | |
| 6,331,840 B1 | 12/2001 | Nielson | |
| 6,334,815 B2 | 1/2002 | Miyamoto et al. | |
| 6,341,728 B1 | 1/2002 | Kondo et al. | |
| 6,361,369 B1 | 3/2002 | Kondo et al. | |
| 6,424,348 B2 | 7/2002 | Parikh et al. | |
| 6,466,218 B2 | 10/2002 | Parikh et al. | |
| 6,480,929 B1 | 11/2002 | Gauthier et al. | |
| 6,522,309 B1 | 2/2003 | Weber | |
| 6,609,977 B1 | 8/2003 | Shimizu et al. | |
| 6,616,053 B2 | 9/2003 | Kondo et al. | |
| 6,669,487 B1 | 12/2003 | Ishihara et al. | |
| 6,672,963 B1 | 1/2004 | Link | |
| 6,716,103 B1 | 4/2004 | Eck et al. | |
| 6,729,548 B2 | 5/2004 | Kondo et al. | |
| 6,743,104 B1 | 6/2004 | Ota et al. | |
| 6,783,076 B2 | 8/2004 | Kondo et al. | |
| 6,786,417 B1 | 9/2004 | Kondo et al. | |
| 6,810,463 B2 | 10/2004 | Okada et al. | |
| 6,821,204 B2 | 11/2004 | Aonuma et al. | |
| 7,066,394 B2 | 6/2006 | Kondo et al. | |
| 7,134,960 B1 | 11/2006 | Shimizu et al. | |
| 7,338,376 B2 | 3/2008 | Eck et al. | |
| 7,445,549 B1 * | 11/2008 | Best | 463/32 |
| 7,445,551 B1 | 11/2008 | Okada et al. | |
| 7,573,462 B2 | 8/2009 | Ouchi | |
| 2001/0047452 A1 | 11/2001 | Okada | |
| 2002/0050999 A1 | 5/2002 | San et al. | |
| 2002/0151360 A1 | 10/2002 | Durham | |
| 2004/0157664 A1 | 8/2004 | Link | |
| 2005/0227761 A1 | 10/2005 | Yoshino et al. | |
| 2005/0245313 A1 | 11/2005 | Yoshino et al. | |
| 2006/0094512 A1 | 5/2006 | Yoshino et al. | |
| 2006/0100021 A1 | 5/2006 | Yoshino et al. | |
| 2006/0111190 A1 | 5/2006 | Yoshino et al. | |
| 2006/0181510 A1 * | 8/2006 | Faith | 345/158 |
| 2007/0178974 A1 * | 8/2007 | Masuyama et al. | 463/43 |
| 2007/0197291 A1 | 8/2007 | Shimizu et al. | |
| 2008/0311991 A1 * | 12/2008 | Goto et al. | 463/37 |
| 2009/0197679 A1 * | 8/2009 | Argentar | 463/36 |
| 2009/0286654 A1 * | 11/2009 | Rice | 482/4 |
| 2010/0331087 A1 * | 12/2010 | Argenter | 463/36 |
| 2011/0081969 A1 * | 4/2011 | Ikeda et al. | 463/37 |

FOREIGN PATENT DOCUMENTS

| | | |
|---|---|---|
| EP | 0 960 637 | 12/1999 |
| JP | 58-116377 | 7/1983 |
| JP | 63-242293 | 10/1988 |
| JP | 4-49989 | 2/1992 |
| JP | 4-140791 | 5/1992 |
| JP | 4-140792 | 5/1992 |
| JP | 5-204820 | 8/1993 |
| JP | 6-42263 | 6/1994 |
| JP | 6-285257 | 10/1994 |
| JP | 7-204349 | 8/1995 |
| JP | 7281806 | 10/1995 |
| JP | 07-294892 | 11/1995 |
| JP | 08-180149 | 7/1996 |
| JP | 10-137447 | 5/1998 |
| JP | 10-222621 | 8/1998 |
| JP | 10-328408 | 12/1998 |
| JP | 11-207034 | 8/1999 |
| JP | 11-333144 | 12/1999 |
| JP | 2000-010655 | 1/2000 |
| JP | 3095145 | 8/2000 |
| JP | 2001-067054 | 3/2001 |
| JP | 2001087555 | 4/2001 |
| JP | 2001-327757 | 11/2001 |
| JP | 2001-005438 | 12/2001 |
| JP | 2002-278689 | 9/2002 |
| JP | 2003-103051 | 4/2003 |
| JP | D1182081 | 6/2003 |
| WO | 00/79372 | 12/2000 |

OTHER PUBLICATIONS

Vidgame.net: Tiger Game.com, printed from http://www.vidgame.net/TIGER/GC.html on Sep. 16, 2004 (4 pages), © 2001-2004.

Consumer Guide®, Tapwave Zodiac PDA/Gaming Device Review, Rating & Prices Personal Digital Assistants (PDAs), printed from http://products.consumerguide.com/cp/electronics/review/index.cfm/id/26877 on Sep. 16, 2004 (3 pages), © 2004.

The Tapwave Zodiac Now Available for Pre-Order at www.Tapwave.com; Tapwave, Inc., Officially Launches the Zodiac Entertainment Console at DEMOmobile, Buisness Wire, p. 5531, Sep. 17, 2003 (7 pages).

Tapwave Zodiac Portable Gaming System and PDA, View Online™, eye candy, Catch a New Wave, David A. Dodson, printed from http://www.viewonline.com/pages/articles/tapwavezodiac.htm on Sep. 16, 2004 (3 pages).
Game Power Australia, E3 2004: Nintendo DS Hands-On Impressions, posted May 12, 2004, printed from http://www.gamepower.com.au/?aid=1960 on Sep. 13, 2004 (2 pages).
PGNx Media: Articles: Hardware Review: Tapwave Zodiac 1, printed from http://www.pgnx.net/articles.php?page=full&id=5762 on Sep. 16, 2004 (5 pages).
Nintendo.ca:: Press Release, Nintendo DS Lets Players Touch the Future, Los Angeles, May 11, 2004, printed from http://www.nintendo.ca/cgi-bin/usersite/display_info.cgi?lang=en&pageNum=9&id=7644861 on Sep. 13, 2004 (3 pages).
PALGN 2004:: Nintendo DS Lowdown, printed from http://palgn.com.au/article.php?id=1179 on Sep. 13, 2004 (3 pages), last update May 2004.
Computer Closet Collection, NEC Turbo Express, printed from wysiwyg://22/http://www.geocities.com/.about.compcloset/NECTurboExpress.htm on Sep. 28, 2000 (2 pages), copyright 1997-1999, last modified Jun. 24, 1999.
NEC Turbo Express, printed from http://www.edu.uni-klu.ac.at/.about.kseiner/express.html on Sep. 28, 2000 (2 pages), document date unknown.
Turbo Express FAQ, printed from http://www.gameconsoles.com/turboexp_faq.htm on Sep. 28, 2000 (18 pages), last revision of document: May 25, 1995.
Computer Closet Collection, Sega Game Gear, printed from wysiwyg://28/http://www.geocities.com/.about.compcloset/SegaGameGear.htm on Sep. 28, 2000 (2 pages), copyright 1997-1999, last modified Jun. 22, 1999.
The Real Game Gear FAQ, Version GG.04, Dec. 1999, printed from http://www.classicgaming.com/museum/realggfag.txt on Sep. 28, 2000 (32 pages).
Computer Closet Collection, Atari Lynx, printed from wysiwyg://12/http://www.geocities.com/.about.compcloset/AtariLynx.htm on Sep. 28, 2000 (2 pages), copyright 1997-1999, last modified Jun. 22, 1999.
[FAQ] Atari Lynx Frequently-Asked Questions, printed from http://www.landfield.com/faqs/games/video-games/atari/lynx on Sep. 28, 2000 (16 pages), last revision of document: May 1, 2000.
Computer Closet Collection, Nintendo Game Boy/Game Boy Light, printed from wysiwyg://40/http://www.geocities.com/.about.compcloset/NintendoGameBoy.htm on Sep. 28, 2000 (5 pages), copyright 1997-1999, last modified Jun. 22, 1999.
Computer Closet Collection, Milton-Bradley Microvision, printed from wysiwyg://52/http://www.geocities.com/.about.compcloset/MiltonBradley-Microvision.htm on Sep. 28, 2000 (2 pages), copyright 1997-1999, last modified Jun. 22, 1999.
Microvision FAQ Version 0.08, copyright 1994, 1995, printed from http://www.gameconsoles.com/microvision_faq.htm on Sep. 28, 2000 (13 pages).
Computer Closet Collection, Sega Nomad, printed from wysiwyg://34/http://www.geocities.com/.about.compcloset/SegaNomad.htm on Sep. 28, 2000 (2 pages), copyright 1997-1999, last modified Jun. 22, 1999.
Sega Nomad Press Announcement of Aug. 22, 1995, printed from http://gamezero.com/team-0whats_new/past/nomad.html on Sep. 28, 2000 (2 pages).
Computer Closet Collection, Tiger Game.com, printed from wysiwyg://46/http://www.geocities.com/.about.compcloset/TigerGameCom.htm on Sep. 28, 2000 (1 page), copyright 1997-1999, last modified Jun. 22, 1999.
Tiger Game.Com, "Low Cost, Big Games", printed from http://gamecenter.com/Consoles/Features/Pocket/ss02.html on Sep. 28, 2000 (2 pages), document date unknown.
British Toys & Hobbies, "Milton Bradley—a very individual range," vol. 29, No. 1, Jan. 1980, (3 pages).
Playthings, Directory Issue, Market Reference Information for Buyers & Manufacturers of Toys, Hobbies & Crafts (2 pages), May 31, 1980.
'83 New Brandai Fair, "Animest," (2 pages).

Playthings, 1983 American Toy Fair Special Highlights Edition, "Thumb Power puts imprint on its new handheld games," (3 pages), Feb. 1983.
Playthings, Special Highlights Edition, Extra: Licensing Scope; Visitor's Guide to New York, vol. 82, No. 2, Feb. 1984 (4 pages).
Microvision—encyclopedia article about Microvision printed from http://encyclopedia.thefreeddictionary.com/Microvision, May 31, 2004.
Computer Closet Collection, Milton Bradley Microsivion, printed from http://www.computercloset.org/MiltonBradleyMicrovision.htm, (2 pages), May 31, 2004.
Digital Equipment Corporation printed from http://db.gamefaqs.com/portable/microvision/file/microvision.txt (11 pages), May 31, 2004.
Milton Bradley Microvision (U.S.) (1979, LCD, 9 Volt (1 or 2), Model# 4952) printed from http://users2.evl.net/rik1138/MB/uVUS.htm.
*68HC705V8 Specification Rev. 2.1* (*General Release*), MCU System Design Group, Oak Hill, Texas, Aug. 12, 1994, pp. iii-xi, xiii, and 89-96.
*HC08—68HC08AS32, Advance Information Rev. 3.0*, Motorola, printed out Jul. 24, 2001, pp. 2-27, 234-242 and 275-308.
Website http://www.repairfaq.org/REPAIR/F_Pinouts.html entiltled "Pinouts for various connectors in Real Life(tm)", page 1 of 3, dated May 20, 1997, author not established.
Christy J., Website http://www.repairfaq.org/REPAIR/F_SNES.html entitled "Super Nintendo Entertainment System: pinouts & protocol", Mar. 26, 1996, 5 pages.
Website http://vba.ngemu.com/faq.shtml entitled VirtualBoy Advance, Frequently Asked Questions, printed Mar. 31, 2004, pp. 1-17.
Website http://vba.ngemu.com entitled "Latest News: Sunday, Feb. 8, 2004—VisualBoyAdvance version 1.71.released", printed Mar. 31, 2004, pp. 1-3.
SourceForge.net:Project Filelist, Project: VisualBoyAdvance: File List, printed Apr. 21, 2004, pp. 1 and 2.
Website http://vba.ngemu.com/links/shtml entitled "Links", printed Mar. 31, 2004, pp. 1 and 2.
Website http://vba.ngemu.com/downloads/shtml entitled "Downloads", printed Mar. 31, 2004, pp. 1-11.
Website http://vba.ngemu.com/screenshots.shtml entitled "Screenshots", printed Mar. 31, 2004, pp. 1-5.
Website http://www.mame.net/hotrod.html entitled "HotRod Joystick and legal roms", printed Apr. 21, 2004, pp. 1 and 2.
Website http://www.mame.net/kibo.html entitled "Kibo explains MAME", printed Apr. 21, 2004, pp. 1-11.
Website http://www.mame.net/edge.html entitled "MAME article, Feb. 1997", printed Apr. 21, 2004, pp. 1 and 2.
Website http://www.mame.net/features.html entitled "Features", printed Apr. 21, 2004, pp. 1 and 2.
Website http://www.mame.net/compilewin.html entitled "How to compile (Win32)", printed Apr. 21, 2004, pp. 1-3.
Website http://www.mame.net/readmedos.html entitled "msdos.txt", printed Apr. 21, 2004, pp. 1-6.
Website http://www.mame.net/readmewin.html entitled "windows.txt", printed Apr. 21, 2004, pp. 1-16.
Website http://www.mame.net/readme.html entitled "mame.txt", printed Apr. 21, 2004, pp. 1-4.
Multiple Arcade Machine Emulator, Frequently Asked Questions v0.77wip, printed Apr. 13, 2004, pp. 1-41.
Website http://www.mame.net/documents.html entitled "Documents", printed Apr. 21, 2004, 1 page.
Website http://www.mame.net entitled "Welcome to the MAME website", printed Apr. 13, 2004, pp. 1-2.
Website http://www.zophar.net/gba.html entitled "GameBoy Advance Emulators", printed Mar. 30, 2004, pp. 1-4.
Website http://www.zophar.net/gb.html entitled "GameBoy Emulators", printed Mar. 30, 2004, pp. 1-12.
"Copyright.txt, VisualBoyAdvance (c) Copyright 2001 by Forgotten (vb@emuhq.com)", 1 page.
Website http://www.gambitstudios.com/whatsnew.asp entitled "News, Announcements and Reviews", printed Jul. 8, 2004, pp. 1-5.

Website http://www.gambitstudios.com/Liberty.asp entitled "Liberty Game Boy Emulator", printed Jul. 8, 2004, pp. 1-4.
Website http://palmboy.suburbia.com.au/news.htm entitled "News about PalmBoy", printed Jul. 8, 2004, pp. 1-7.
Website http://palmboy.suburbia.com.au/ entitled "PalmBoy v.3.3b", printed Jul. 8, 2004, pp. 1-11.
"readme.txt, Snes9x: The Portable Super Nintendo Entertainment System Emulator", v1.19 Jun. 5, 1999, pp. 1-13.
Website http://little-bat.de/prog/download/z80_68k/z80_68k.html entitled "z80-68k-v150, Z80 Engine written in 68020 assembler for inclusion in C/C++ projects", copyright 1994-1999, printed on Jan. 18, 2006, pp. 1-7.
Website http://www.eff.org/patent/wanted/prior.php?p=nintendo entitled "Patent Busting Project", printed Jul. 26, 2006, 3 pages.
Website http://gb98.pocketheaven.com/ entitled "GameBoy 98 Homepage", printed Jan. 23, 2008, pp. 1-4.
Website http://users.erols.com/tiltonj/tech/nescont.html entitled "Nintendo NES and SNES controllers", printed Nov. 1, 2004, pp. 1-3.
Website http://repairfaq.ece.drexel.edu/REPAIR/F_Pinouts3.html entitled "Pinouts for various connectors in Real Life(tm)", printed Oct. 25, 2004, pp. 1-10.
Website http://repairfaq.ece.drexel.edu/REPAIR/F_Pinouts2.html entitled "Pinouts for various connectors in Real Life(tm)", printed Oct. 25, 2004, pp. 1-13.
Website http://repairfaq.ece.drexel.edu/REPAIR/F_Pinouts1.html entitled "Pinouts for various connectors in Real Life(tm)", printed Oct. 25, 2004, pp. 1-15.
Website http://www.gamesx.com/controldata/psxcont/psxcont.htm McCubbin, Andrew J., "Sony Playstation Controller Information", Aug. 13, 1998, 9 pages.
Playthings, Unveiling the 1983 Toy Lines Electronic Circuit: Expanded Section, "Nintendo Goes Beyond Hand-Held Electronic Games," (3 pages), Feb. 1983.
TH&C (Toys Hobbies & Crafts), Special Toy Fair Issue, "Electronic Toys in '79: Buyers Brace for More Shortages," (4 pages), 1979.
Website http://phoinix.sourceforge.net/ entitled Phoinix, the free Gameboy emulator for PalmOS, by Bodo Wenzel; pp. 1-5; 2004.
"Readme vba v0.4.txt, Welcome to VisualBoyAdvance version 0.4", pp. 1-3, 2004.
Playthings, American Toy Fair Special Highlights Edition, "Tomy augments toys with none additions for kids aged three and up," (3 pages), Circle No. 779 on Reader Inquiry Card, 1980.
Tiger Game.Com, "Low Cost, Big Games", printed from http://gamecenter.com/Consoles/Features/Pocket/ss02.html on Sep. 28, 2000 (2 pages).
Mario Brothers Handheld Game; 1983.
Bombsweeper Handheld Game; 1987.
Gameboy Advance SP Handheld Game; 2003.

\* cited by examiner

GAME CONSOLE

This application is a divisional of application Ser. No. 11/111,985, filed Apr. 22, 2005, which is a continuation-in-part of application Ser. No. 10/921,957, filed on Aug. 20, 2004. The contents of each of these applications are incorporated herein by reference.

The illustrative embodiments relate to an electronic game and communications device and, more specifically, to a new console configuration for a portable, handheld electronic game with dual screens. Certain of the illustrative embodiments also relate to a portable game machine including two or more display units, on each of which a three-dimensional game image, generated by a three-dimensional image processing unit, is displayed.

BACKGROUND

Portable, handheld game devices are by now well known in the art. See, for example, U.S. Pat. Nos. 6,716,103; 6,743,104; 6,821,204. Game devices previously have not had, however, dual screen functionality in combination with touch-sensitive technology, and the capability of accommodating different-sized game cards packaged in a novel and easy-to-use game console.

Brief Description of the Illustrative Embodiments

In an exemplary embodiment of this invention, a portable, handheld electronic game device is provided in a unique console configuration, outfitted and arranged for easy access to various functional features and related aspects of the game device.

Generally, the portable game device in the exemplary embodiment is made up of a main body and a cover body that is pivotally attached to the main body for movement between open and closed positions. Twin, backlit, color liquid crystal displays (LCD's) are provided, one on each of the inner surfaces of both the main body and cover body such that, when the cover body is pivoted over the main body to the closed position, the display screens substantially overlie one another and are hidden from view (and thus protected). Each LCD is a three inch screen that can reproduce true 3-D views, and, one of the screens also employs touch-sensitive technology for enhanced interaction with associated games. To further enhance the interactive experience, a stylus is provided with the game for activating the touch screen, and a blind bore is provided in the main body for storing the stylus when it is not being used.

The main body of the device is also provided with all of the game control buttons. Most of the control buttons are on the inner face of the main body, on either side of the display screen, along with microphone, recharge, and power indicators. The rearward portion of a peripheral edge surrounding the main body also supports an additional pair of buttons for game control. The peripheral edge of the main body also provides access to various other features and functions of the device. For example, a forward portion of the peripheral edge incorporates a volume control slide, a first game slot as well as headphone/microphone connectors. The rearward portion of the peripheral edge is provided with, in addition to the control buttons, an external extension connector for connecting an AC adaptor that can be used to either recharge the internal battery or to operate the game device using household power; a wrist strap attachment mechanism; the stylus port; and a second game slot designed to accommodate larger game cards from earlier game systems manufactured by the assignee of this invention.

In addition to the LCD on the inner face of the cover body, the latter is also provided with a pair of stereo speakers, one on either side of the display screen.

A substantially square game or memory card designed especially for use with the game device disclosed herein has planar upper and lower surfaces, a forward edge, a rearward edge, and a pair of side edges. The forward end of the upper surface is formed with a recess in which a plurality of terminal or electrical connector strips are located, extending from a rear wall of the recess to the forward edge of the card. The terminal strips are parallel to each other and are separated by raised ribs that extend from the rear wall of the recess to the forward edge. These ribs protect the terminal strips from contact with the user's hands or other objects.

An enlarged radius is provided at one forward corner of the card, where the forward edge of the card meets one side edge of the card. A first notch is also formed at this same corner, and a second notch is formed along this same side edge, intermediate the forward and rearward ends of the card. These two notches interact with a spring-loaded "push-push" mechanism inside the game slot for controlled insertion and ejection of the game card into and from the game console.

The opposite forward corner of the card is defined by a smaller radius merging into the other side edge that is defined by a stepped shoulder in the upper plane of the card, extending along the entire length of the card. This shoulder insures correct orientation of the card when inserted into the game card slot.

Accordingly, in one aspect, the present invention relates to a portable, handheld game console comprising a main body incorporating a first display screen on an inner face of the main body, and a cover body incorporating a second display screen on an inner face of the cover body, the main body hingedly connected to the cover body along adjacent forward and rearward edges, respectively, such that the cover body is movable between a closed position where the cover body overlies the main body with the first and second display screens hidden from view, and an open position where the cover body is folded away from the main body with the first and second display screens visible to a user; wherein the main body is provided with a plurality of control buttons and at least one game card slot for receiving a game card of first predetermined dimensions.

In another aspect, the present invention relates to a portable, handheld game console comprising a main body incorporating a first touch-sensitive display screen on an inner face of the main body, and a cover body incorporating a second display screen on an inner face of the cover body, the main body hingedly connected to the cover body along adjacent forward and rearward edges, respectively, such that the cover body is movable between a closed position where the cover body overlies the main body with the first and second display screens hidden from view, and an open position where the cover body is folded away from the main body with the first and second display screens visible to a user; wherein the main body is provided with a plurality of control buttons, at least one game card slot for receiving a game card of first predetermined dimensions; and a second game slot for receiving another game card of second predetermined dimensions different from the first predetermined dimensions.

In another aspect, the present invention relates to a substantially square memory card for a game machine comprising a substantially flat card body having length, width and thickness dimensions, the card body defined by upper and lower surfaces, and by a forward edge, a rearward edge and a pair of side edges; and a plurality of electrically conductive terminal strips adjacent the forward edge; wherein one of the side edges has a single continuous step configuration along the entire length dimension of the card, and wherein a first notch is formed in a first forward corner of the card where the forward edge meets the other of the pair of side edges.

In accordance with a feature of an illustrative embodiment, the portable game machine includes hardware/software capable of simultaneously displaying different three-dimensional images on two display units by using a single three-dimensional image processing unit without causing flicker on display screens.

Also, another feature of an illustrative embodiment is to make it possible for a portable game machine to include two display units, at least one two-dimensional image processing unit, and a single three-dimensional image processing unit, wherein a game image generated by the two-dimensional image processing unit is displayed on one of the display units and a game image generated by the three-dimensional image processing unit is displayed on the other display unit, and to simultaneously display different three-dimensional game images on the two display units without adding another three-dimensional image processing unit or substantially changing the configuration of the portable game machine.

The handheld portable game device and associated memory card in accordance with this invention will now be described in detail in connection with the drawings identified below.

BRIEF DESCRIPTION OF THE DRAWINGS

FIG. 15 is an illustration showing one example of a game screen displayed on a first display screen 11a and a second display screen 212a;

DETAILED DESCRIPTION OF EXAMPLE EMBODIMENTS

Figure 1:
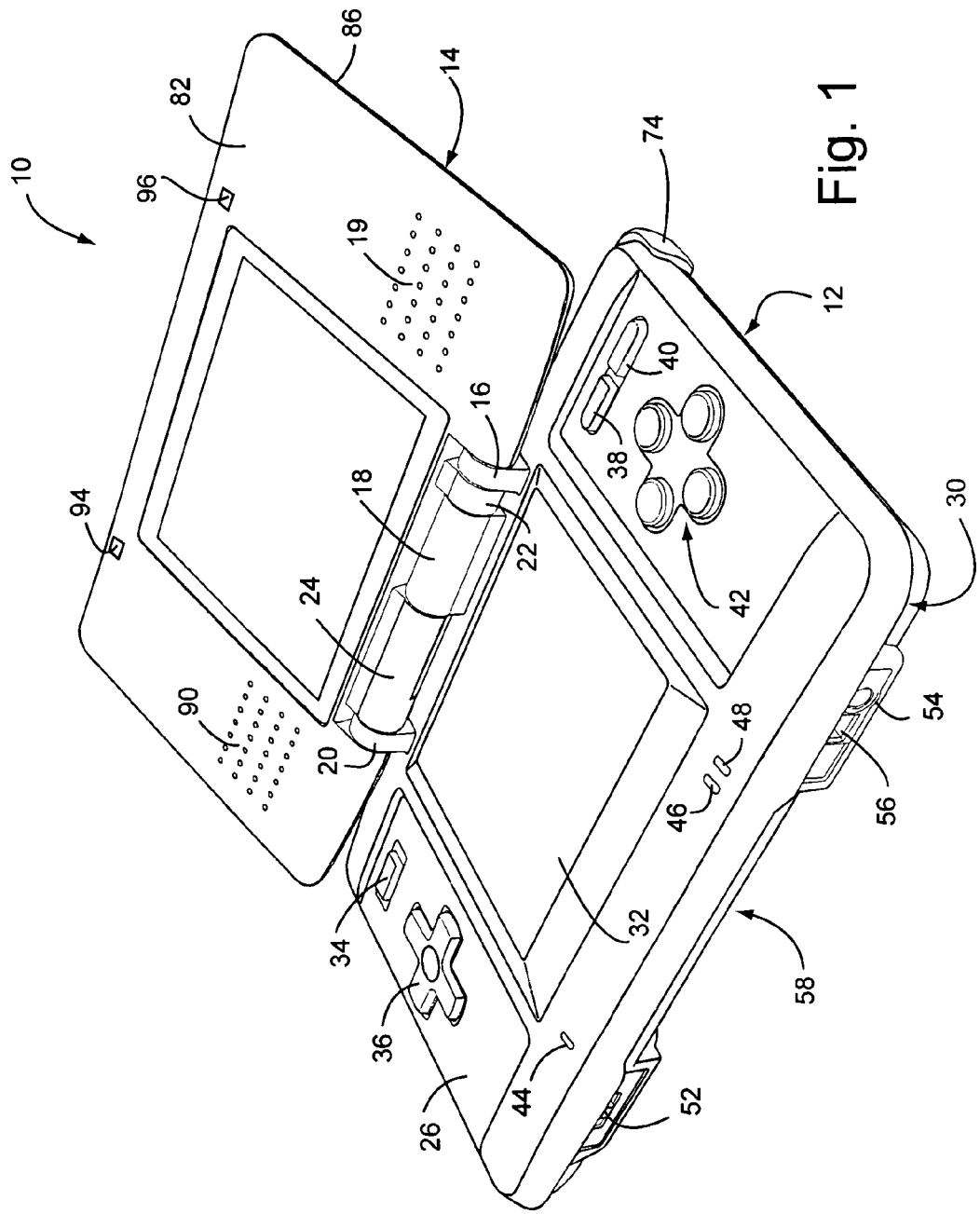
FIG. 1 is a perspective view of the electronic game and communications device in accordance with an exemplary embodiment of the invention, with the device shown in an open, ready-to-use orientation.
Figure 2:
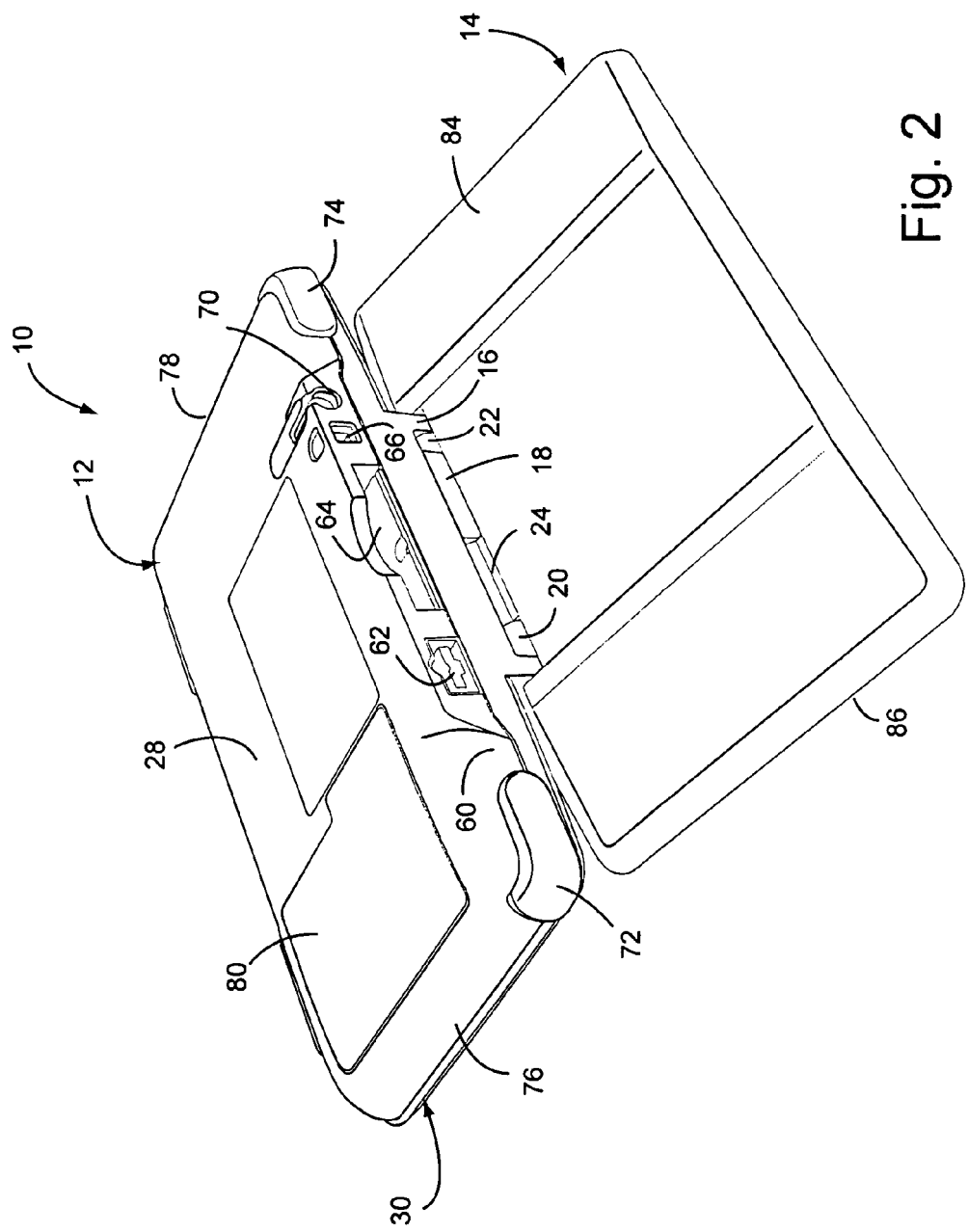
FIG. 2 is a inverted perspective view of the game device shown in FIG. 1.

Referring to FIGS. 1 and 2, in an illustrative embodiment the game device or console 10 includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 (FIG. 2) and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the exemplary embodiment is a backlit, color liquid crystal display (LCD). This screen is touch sensitive and may be activated by a stylus, described further herein. A power button 34 is located in the upper left corner of face 26 and is used to turn the game on and off. A cross-shaped directional control button 36 is located adjacent and below the power button 34, and is used for game play control.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for game play control. A microphone 44 is located below the left edge of screen 32 for use with specially designed games having a microphone feature. A battery recharge indicator LED 46 and a power indicator LED 48 are also located on the upper face 26, adjacent the lower edge thereof, below the right edge of screen 32.

Figure 3:
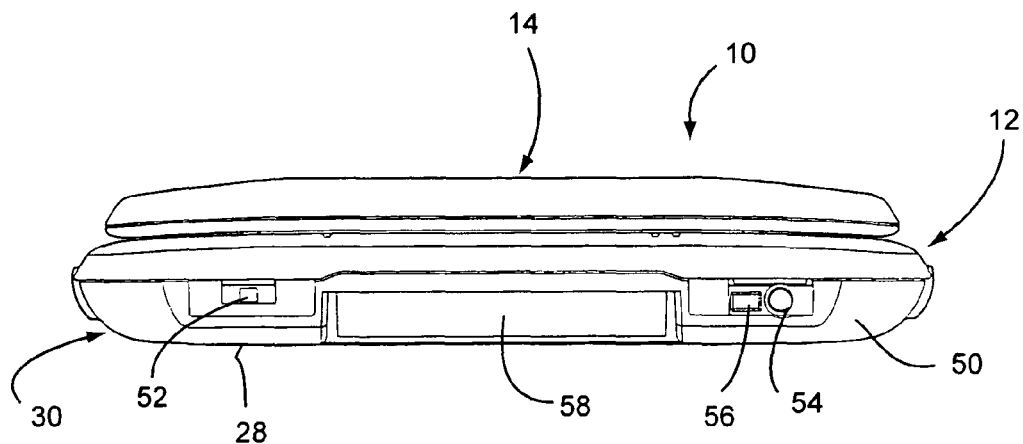
FIG. 3 is a front elevation of the device shown in FIG. 1, but with the game shown in a closed position.
Figure 4:
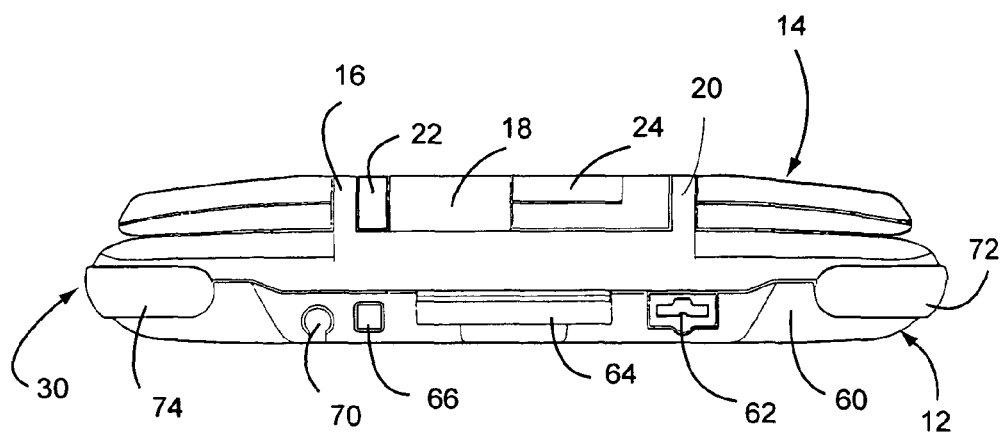
FIG. 4 is a rear elevation of the device shown in FIG. 3.

With reference now especially to FIG. 3, a lower or forward portion 50 of the peripheral edge 30 (closest to the user) is provided with a volume control slide 52 and headphone and microphone connectors 54, 56 on either side of a first game slot 58. Slot 58 is especially designed for larger game cartridges or cards originally designed for use with the assignee's Game Boy Advance® game system.

Figure 5:
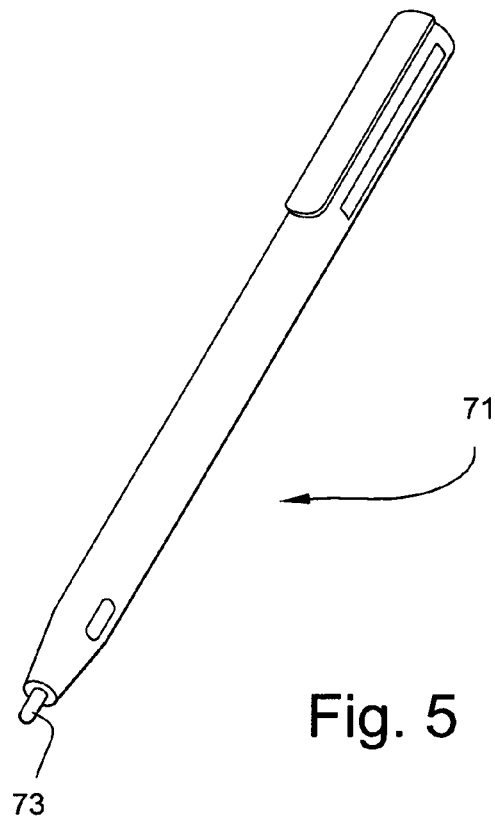
FIG. 5 is a perspective view of a stylus for use with the game device shown in FIGS. 1-4.

As best seen in FIG. 2, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this game device. The second game slot 64 is smaller than the first game slot 58, reflecting the different sizes of the game cards. Openings 66, 68 form an elbow-shaped through slot adapted for securing a wrist strap (not shown), thereby enabling the user to secure the game device to the body and thus minimize the potential for losing or misplacing the game. A stylus port or holder, in the form of a blind bore 70 is located adjacent the wrist-strap mount for holding a stylus 71 (FIG. 5) before or after use.

The stylus 71 is a plastic pencil-shaped device with a rounded tip 73 and is used to activate the touch screen 32.

A pair of left, right control buttons (or shoulder buttons) 72, 74 are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 2) for accessing a rechargeable battery pack located within the main body.

The cover body 14 also has an upper (or inner) face 82 (FIG. 1) and a lower (or outer) face 84 (FIG. 2) connected by a peripheral edge 86. The upper face 60 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body.

As already noted, the game card slot 58 is sized and adapted to receive a conventional game card designed for the by now well known Nintendo Gameboy Advance System®. Accordingly, the game card per se for slot 58 does not form any part of this invention and need not be described further.

Figure 6:
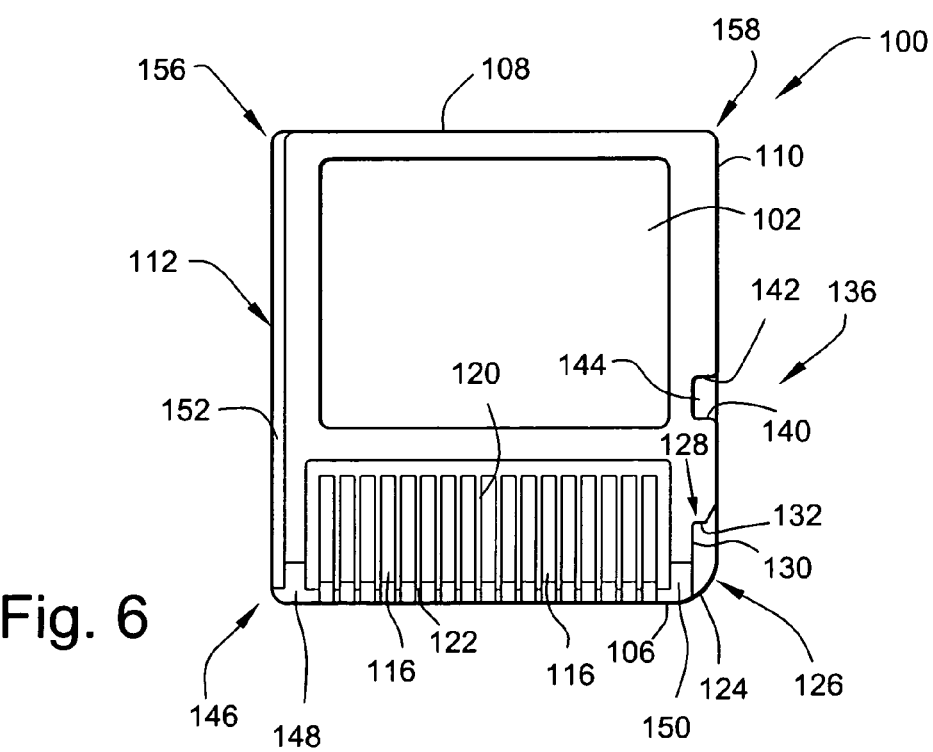
FIG. 6 is a plan view of a game card for use with the game device shown in FIGS. 1-4.
Figure 7:
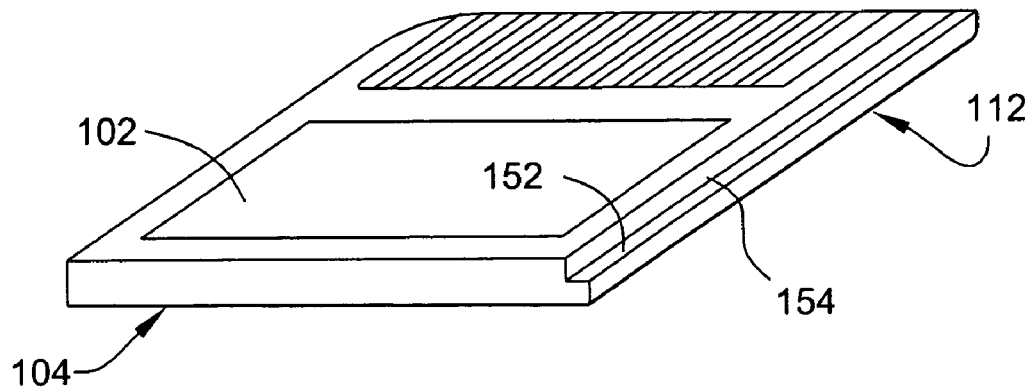
FIG. 7 is a rear perspective view of the game card shown in FIG. 6.
Figure 8:
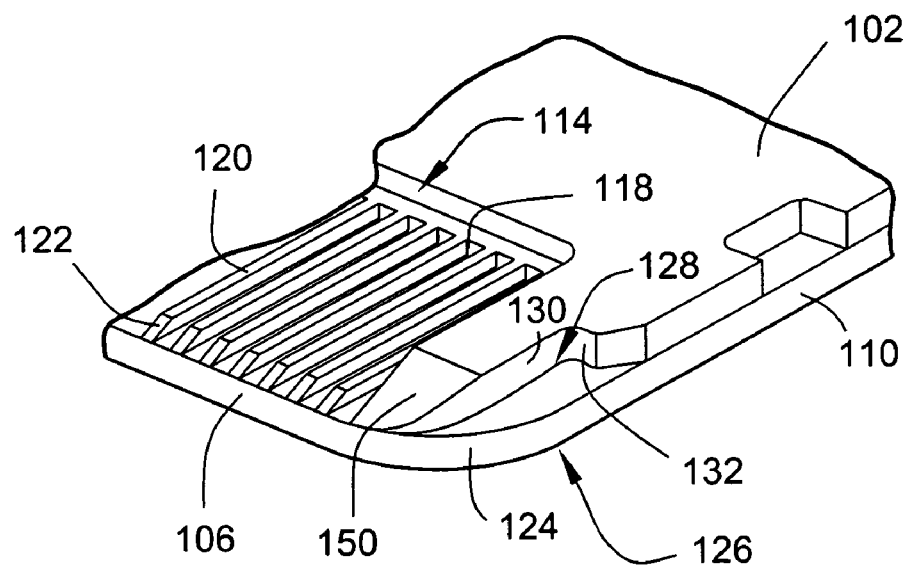
FIG. 8 is an enlarged perspective view of a front, right corner of the card shown in FIG. 6.

The new game or memory card 100 designed especially for use with this game device is shown in FIGS. 6, 7 and 8.

The game or memory card 100 is preferably of molded plastic construction and has substantially planar upper and lower surfaces 102, 104, respectively, a forward edge 106, rearward edge 108 and side edges 110, 112. The forward end of the upper surface 102 is formed with a rectangular recess 114 in which a plurality of terminal strips 116 are located, extending from a rear wall 118 of the recess to the forward edge 106 of the card. The rearward wall 115 of the recess is substantially perpendicular to the upper and lower surfaces 102, 104 but, as a practical matter, is sloped by no more than about 3 degrees simply to facilitate removal of the card from the mold during manufacture of the card. The terminal strips 116 are parallel to each other and are separated by raised ribs 120 that also extend from the rear wall 118 to the forward edge 106. The free ends 122 of the ribs 120 are chamfered as best seen in FIG. 8 to facilitate sliding entry of the card into the slot 58 in the main body 12. Ribs 120 also protect the terminal strips 116 from contact with the users' hands or other objects. The recess 114 and array of terminal strips 116 are not centered along the forward edge 106 of the card, but rather, are offset laterally toward the side edge 112 for a purpose explained in greater detail below.

An enlarged radius 124 is formed at forward corner 126 where the side edge 110 meets forward edge 106. A first notch 128 is formed in corner 126, defined by a vertical notch side wall 130, a vertical notch back wall 132 and a flat notch bottom wall 134. The latter is parallel to the upper and lower card surfaces 102, 104, while notch side wall 130 is parallel to side edges 110, 112, and notch back wall is perpendicular to the notch side wall 130 and parallel to the card forward edge 106. The depth of the notch is about half the approximate ⅛ inch thickness of the card, and the length of the notch is about ¼ inch, which in turn, is about half the length of the recess 114. Rearwardly of the notch 128, along the card side edge 110, there is formed a second notch 136 that opens to the side of the card, defined by parallel side walls 140, 142 and a back wall 144. Side walls 140, 142 are parallel to forward and rearward card edges 106, 108 while back wall 144 is parallel to card side edges 110, 112. An angled surface 145 connects back wall 144 to the edge 110. Here again, the depth of the notch is about half the thickness of the card, and the length of the notch is about ⅛ inch.

Notches 128 and 136 cooperate with components of a "push-push" mechanism inside the game slot 64 to provide controlled, spring-loaded movement of the game card during insertion and ejection.

The opposite forward corner 146 of the card where side edge 112 meets forward edge 106 is defined by a smaller radius than radius 124. Note that the forward surfaces 148, 150 of the card on either side of the recess 114 are also chamfered to substantially the same degree as the chamfer on ribs 120.

Side edge 112 is stepped along its entire length in the upper plane of the card only, as defined by horizontal shoulder 152 that is parallel to upper and lower surfaces 102, 104 and a recessed edge portion shoulder 154 that is parallel to the side edges 110, 112. This shoulder insures correct orientation of the card when inserted into a game console slot.

The rearward edge 108 of the card is substantially uniform in profile from side edge 110 to side edge 112, with both rearward corners 156, 158 rounded by a radii similar to the radius at corner 146.

The dimensions of the card are matched to the game machine entry slot, and in the exemplary embodiment, the card 100 is substantially square, with a length dimension (front-to-back) of 1⅜", and a width dimension (side-to-side) of 1¼".

Figure 9:
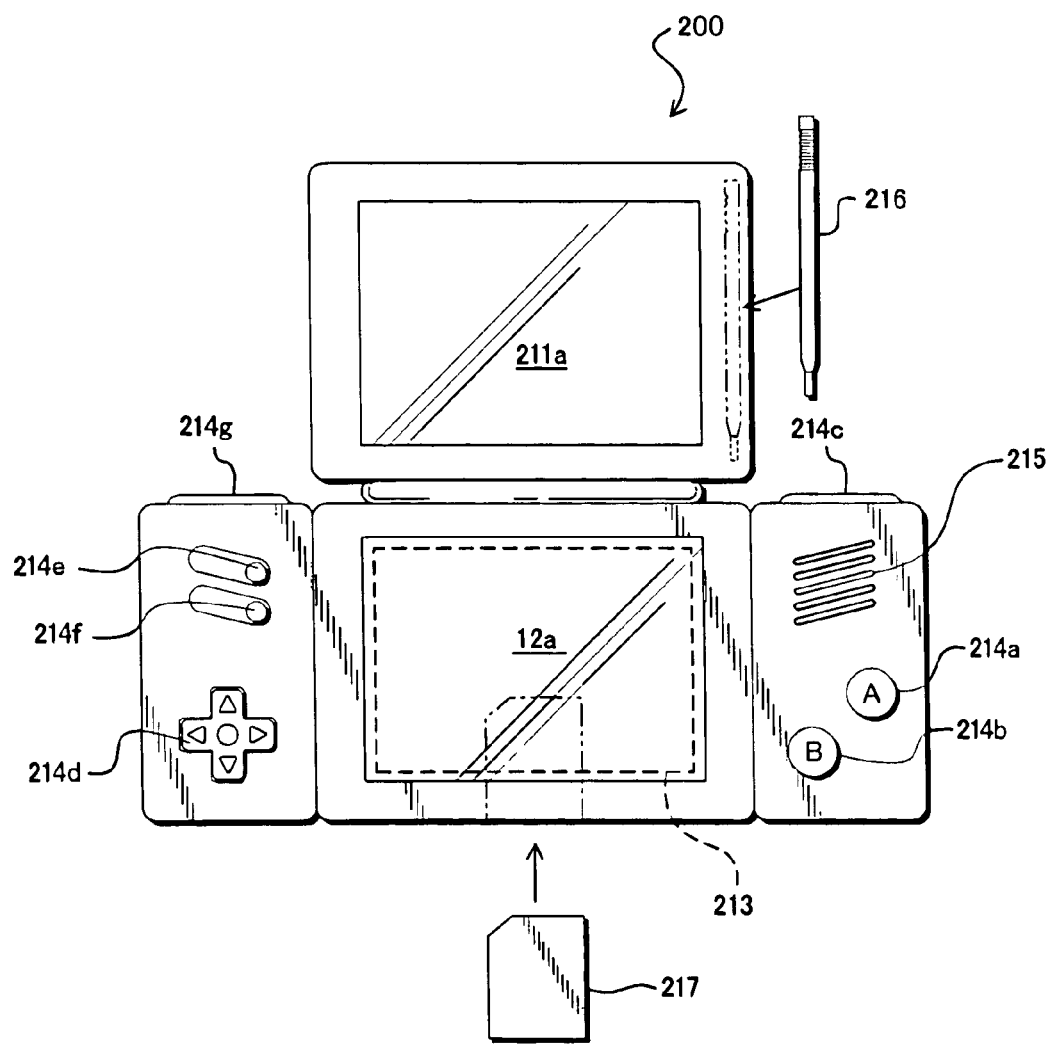
FIG. 9 is an external view of a portable game machine according to a further illustrative embodiment of the present invention.

FIG. 9 is a further illustrative embodiment of a portable game machine 200. As with the prior embodiment, a further exemplary game machine physically including two display screens with one of the display screens being covered with a touch panel is exemplarily described. In the present embodiment, a game image is displayed on at least the display screen covered with the touch panel. Also, a non-portable video game machine, an arcade game machine, a portable terminal, a cellular phone, or a personal computer may be used as the game machine.

FIG. 9 is an external view of the portable game machine 200. As shown in FIG. 9, the portable game machine 200 includes two display screens, that is, a first display screen 211a and a second display screen 212a. The surface of the second display screen 212a is covered with a touch panel 213. Also, to the right of the second display screen 212a, the game machine includes an A button 214a, a B button 214b, and an R switch 214c, which are operable by the right hand of the player, and a loudspeaker 215 for producing game music. To the left of the second display screen 212a, the game machine includes a cross key 214d, a start button 214e, a select button 214f, and an L switch 214g, which are operable by the left hand of the player. Also, the portable game machine 200 includes a removable stylus 216 for input to the touch panel 213. Furthermore, the portable game machine 200 has, removably inserted therein, a cartridge 217, which is a storage medium having stored therein a game program of the illustrative embodiments. Note that, in the present embodiment, the touch panel 213 is exemplarily provided as an input unit, but this does not restrict the present invention.

Figure 10:
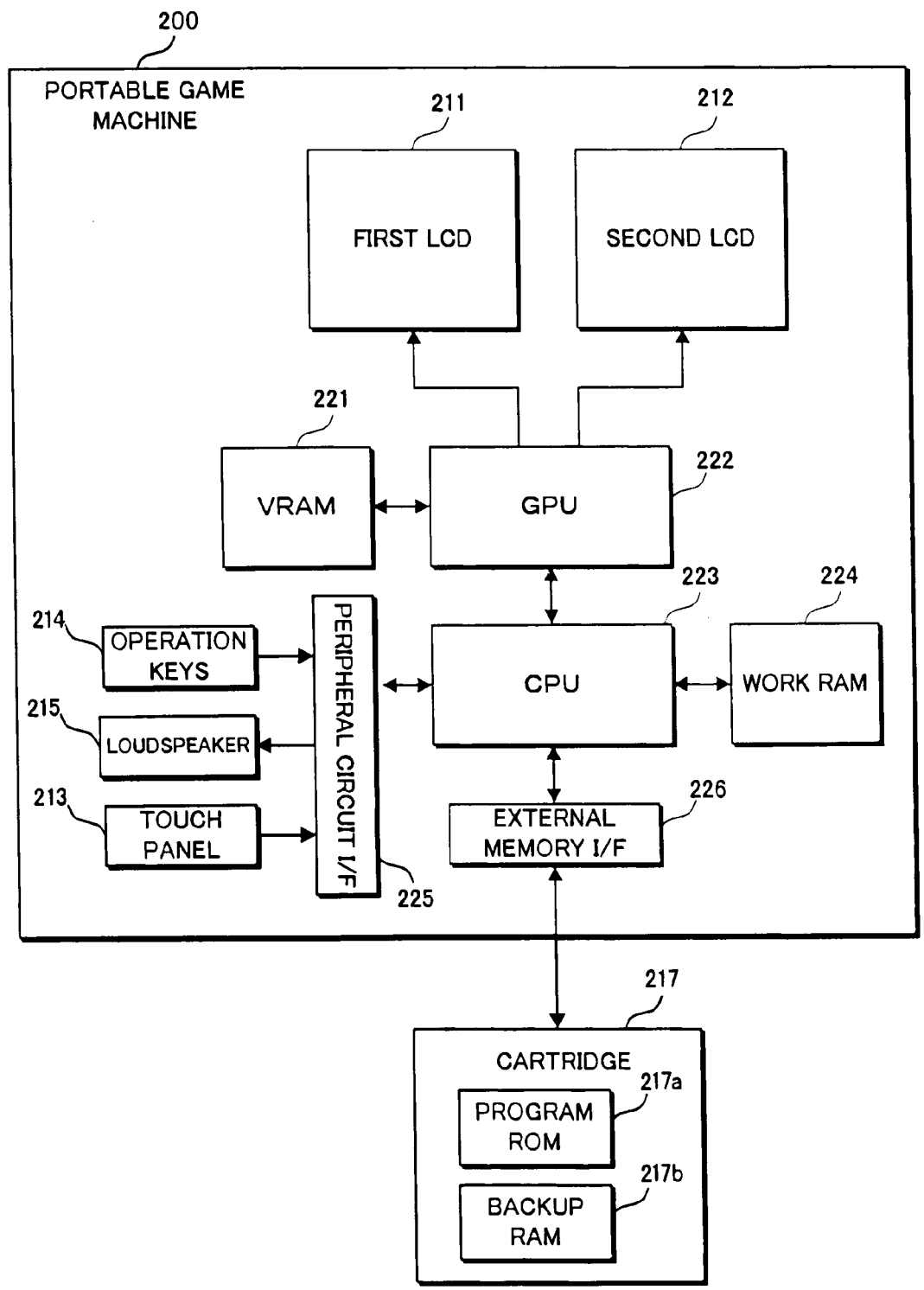
FIG. 10 is an illustration showing an internal configuration of a portable game machine.

FIG. 10 is a block diagram showing the portable game machine 200. It should be understood that the hardware/software and operational description which follows is applicable to the illustrative embodiment shown in FIGS. 1-8 as well as the illustrative embodiment shown in FIG. 9. As shown in FIG. 10, the portable game machine 200 includes a CPU (central processing unit) 223, which is an example of a computer for executing the game program, and other components. The CPU 223 includes a work RAM (working storage unit) 224, a GPU (graphic processing unit) 222, and a peripheral circuit I/F (interface) 225 that are electrically connected to one another. The work RAM 224 is a memory for temporarily storing, for example, the game program to be executed by the CPU 223 and calculation results of the CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 211a of the first LCD 211 and the second display screen 212a of the second LCD 212. The peripheral circuit I/F 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input (specified) with the stylus 216.

Furthermore, the CPU 223 is electrically connected to the external memory I/F 226, in which the cartridge 217 is inserted. The cartridge 217 is a storage medium for storing the game program and, specifically, includes a program ROM 217a for storing the game program and a backup RAM 217b for rewritably storing backup data. The game program stored in the program ROM 217a of the cartridge 217 is loaded to the work RAM 224 and is then executed by the CPU 223. In the present embodiment, an exemplary case is described in which the game program is supplied from an external storage medium to the portable game machine 200. However, the game program may be stored in a non-volatile memory incorporated in advance in the portable game machine 200, or may be supplied to the portable game machine 200 via a wired or wireless communication circuit.

Figure 11:
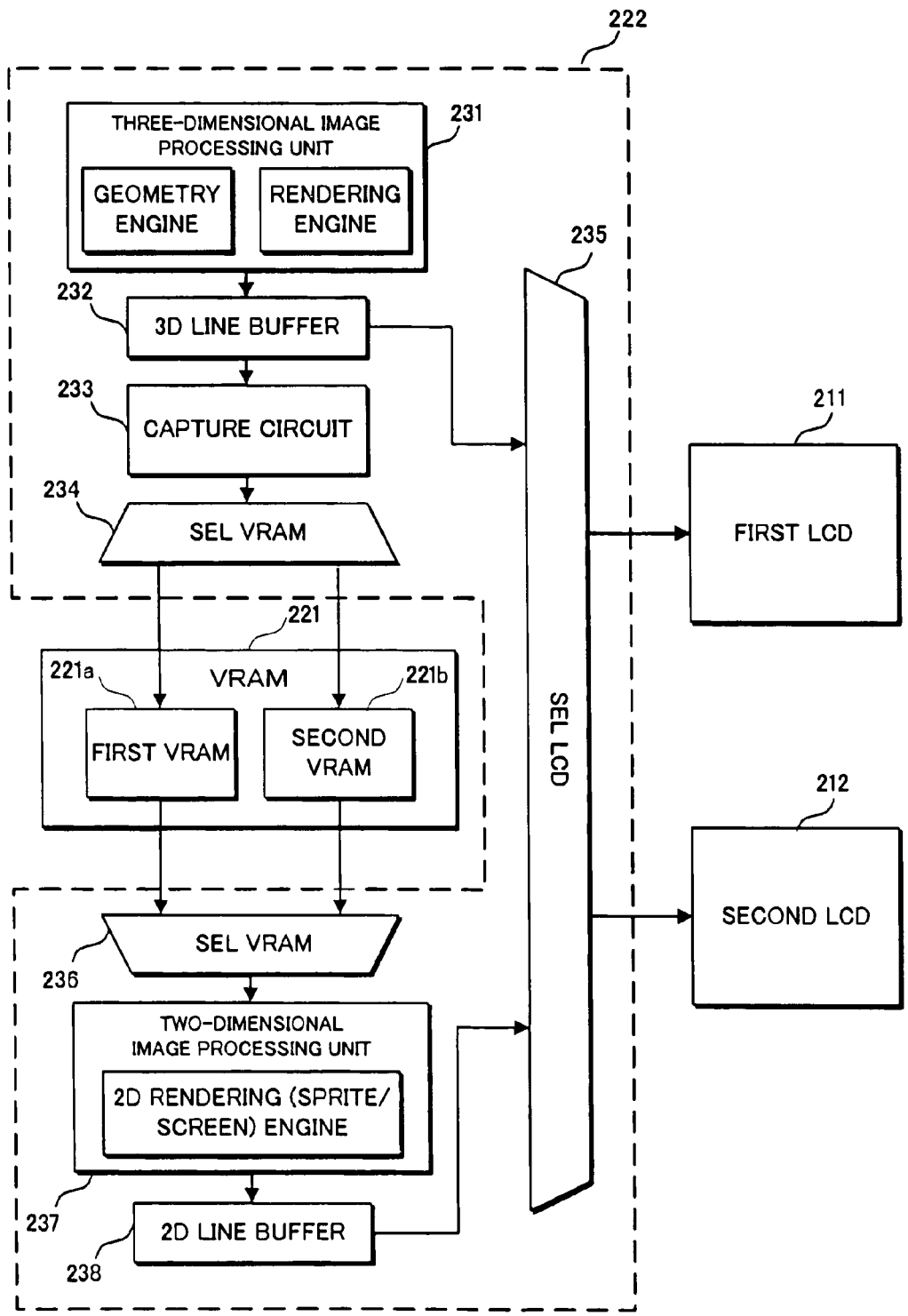
FIG. 11 is an illustration showing an internal configuration of a GPU 222.

FIG. 11 is a block diagram of the GPU 222. The GPU 222 includes two image processing units, that is, a three-dimensional image processing unit 231 and a two-dimensional image processing unit 237. The three-dimensional image processing unit 231 includes a geometry engine for calculating each vertex of a three-dimensional model based on three-dimensional model data and a rendering engine for generating a game image from the three-dimensional model disposed on a virtual three-dimensional game space. The two-dimensional image processing unit 237 includes a 2D rendering engine for generating a game image based on two-dimensional image data representing characters and two-dimensional image data representing backgrounds. More specifically, the two-dimensional image processing unit 237 disposes a two-dimensional image representing a character on a virtual screen called a "sprite" and a two-dimensional image representing a background on a virtual screen called a "screen", and then synthesizes these virtual screens to generate a game image to be eventually displayed.

The three-dimensional image processing unit 231 is connected to the 3D line buffer 232. The 3D line buffer 232 is a buffer memory for temporarily retaining image data for one scanning line of the first LCD 211 (or the second LCD 212). The image data generated by the three-dimensional image processing unit 231 is stored in this 3D line buffer 232 sequentially by one line.

The 3D line buffer 232 is connected to a capture circuit 233 and an LCD selector (SEL LCD) 235. The capture circuit 233 sequentially reads image data for one line stored in the 3D line buffer 232 and then sequentially stores the read image data in the VRAM 221, which will be described further below, thereby capturing the game image generated by the three-dimensional image processing unit 231.

The capture circuit 233 is connected to a VRAM selector (SEL VRAM) 234. The VRAM 221 is provided with two VRAMs, that is, a first VRAM 221a and a second VRAM 221b. Instead of these two first and second VRAMs 221a and 221b, a single VRAM may be used with its two different storage areas being used as the first VRAM 221a and the second VRAM 221b. The VRAM selector 234 switches an output destination of the capture circuit 233 between the first VRAM 221a and the second VRAM 221b.

The first VRAM 221a and the second VRAM 221b are connected to a VRAM selector (SEL VRAM) 236. The VRAM selector 236 switches a source of data to the two-dimensional image processing unit 237 between the first VRAM 21a and the second VRAM 221b.

The two-dimensional image processing unit 237 is connected to a 2D line buffer 238. As with the 3D line buffer 232, the 2D line buffer 238 is a buffer memory for temporarily retaining image data for one scanning line of the second LCD 212. The image data generated by the two-dimensional image processing unit 237 is stored in this 2D line buffer 238 sequentially by one line.

The 2D line buffer 238 is connected to an LCD selector 235. The LCD selector 235 switches an output destination of the 3D line buffer 232 between the first LCD 211 and the second LCD 212, and an output destination of the 2D line buffer 238 between the first LCD 211 and the second LCD 212. In the present embodiment, the LCD selector 235 performs control such that, when the output of the 3D line buffer 232 is supplied to the first LCD 11, the output of the 2D line buffer 38 is supplied to the second LCD 212, and when the output of the 3D line buffer 232 is supplied to the second LCD 212, the output of the 2D line buffer 238 is supplied to the first LCD 211.

The portable game machine 200 has the above-described structure. Generally, the game image generated by the three-dimensional image processing unit 231 is supplied via the 3D line buffer 232 and the LCD selector 235 to the first LCD 211, while the game image generated by the two-dimensional image processing unit 237 is supplied via the 2D line buffer 238 and the LCD selector 235 to the second LCD 212. As a result, the three-dimensional game image generated by the three-dimensional image processing unit 231 is displayed on the first display screen 211a, while the two-dimensional game image generated by the two-dimensional image processing unit 237 is displayed on the second display screen 212a. However, the present embodiment has a feature in which the above-structured portable game machine 200 is used to display different three-dimensional game images on two display screens, that is, the first display screen 211a and the second display screen 212a. Hereinafter, the operation of the portable game machine 200 according to the present embodiment is described.

The portable game machine 200 alternately performs operations with periods of one frame. Hereinafter, the operation of the portable game machine 200 is described as being divided into a process in an odd-numbered frame and a process in an even-numbered frame. Note that the "odd-numbered frame" and the "even-numbered frame" are merely so called for convenience. In other words, if one frame is assumed to be an odd-numbered frame, frames before and after that frames are even-numbered frames. Conversely, if one frame is assumed to be an even-numbered frame, frames before and after that frames are odd-numbered frames.

Figure 12:
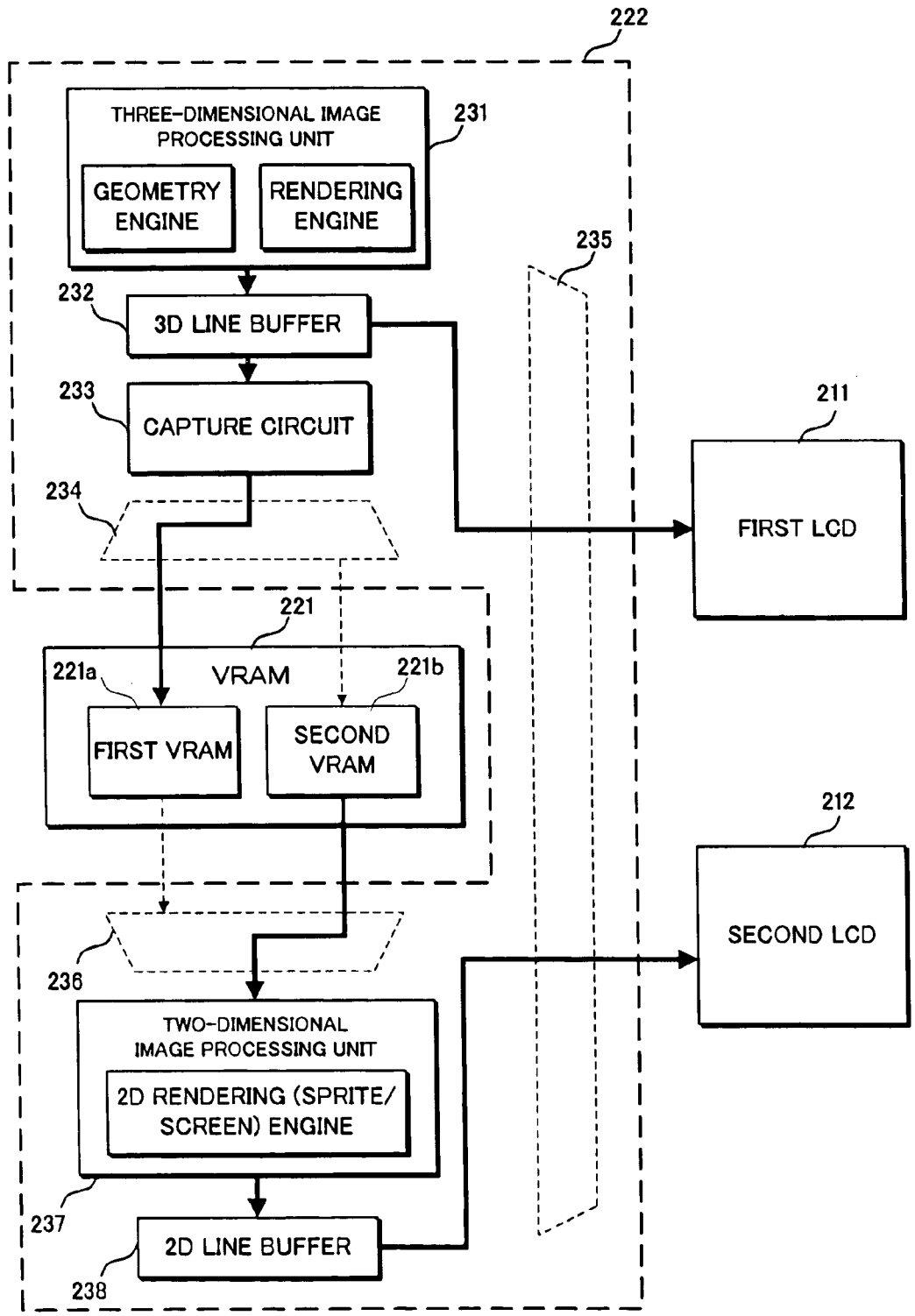
FIG. 12 is an illustration showing the operation of a portable game machine in an odd-numbered frame.

FIG. 12 is an illustration showing the operation of the portable game machine 200 in an odd-numbered frame. As shown in FIG. 12, in the odd-numbered frame, the game image generated by the three-dimensional image processing unit 231 is supplied via the 3D line buffer 232 to the first LCD 211. Also, the output from the capture circuit 233 is supplied to the first VRAM 221a. That is, the game image supplied in this frame to the first LCD 211 is captured by the capture circuit 233, and is then stored in the first VRAM 221a. Also, the two-dimensional image processing unit 237 reads the game image stored in the second VRAM 221b (the game image captured in the immediately-preceding even-numbered frame by the capture circuit 233, as will be described further below). This game image is, as will be described further below, identical to the game image supplied in the immediately-preceding even-numbered frame to the second LCD 212. The game image read by the two-dimensional image processing unit 237 is supplied via the 2D line buffer 238 to the second LCD 212. As such, in the odd-numbered frame, the game image generated in this frame by the three-dimensional image processing unit 231 is supplied to the first LCD 211, while the game image generated in the immediately-preceding even-numbered frame by the three-dimensional image processing unit 231 is supplied to the second LCD 212.

Figure 13:
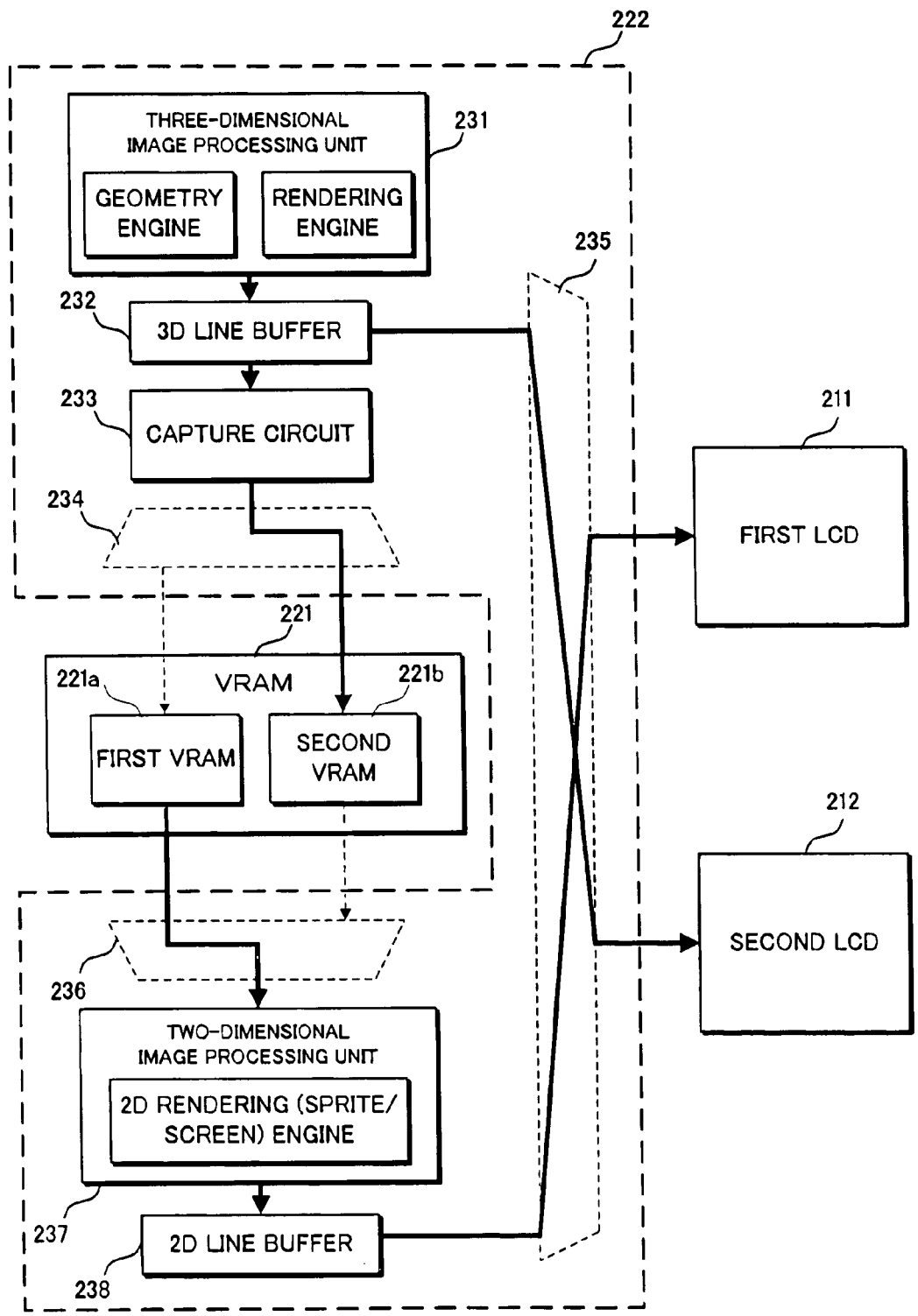
FIG. 13 is an illustration showing the operation of the portable game machine in an even-numbered frame.

FIG. 13 is an illustration showing the operation of the portable game machine 200 in an even-numbered frame. As shown in FIG. 13, in the even-numbered frame, the game image generated by the three-dimensional image processing unit 231 is supplied via the 3D line buffer 232 to the second LCD 212. Also, the output from the capture circuit 233 is supplied to the second VRAM 221b. That is, the game image supplied in this frame to the second LCD 212 is captured by the capture circuit 233, and is then stored in the second VRAM 221b. Also, the two-dimensional image processing unit 237 reads the game image stored in the first VRAM 221a (the game image captured in the immediately-preceding odd-numbered frame by the capture circuit 233, as will be described further below). This game image is identical to the game image supplied in the immediately-preceding odd-numbered frame to the first LCD 211. The game image read by the two-dimensional image processing unit 237 is supplied via the 2D line buffer 238 to the first LCD 211. As such, in the even-numbered frame, the game image generated in this frame by the three-dimensional image processing unit 231 is supplied to the second LCD 212, while the game image generated in the immediately-preceding odd-numbered frame by the three-dimensional image processing unit 231 is supplied to the first LCD 211.

Figure 14:
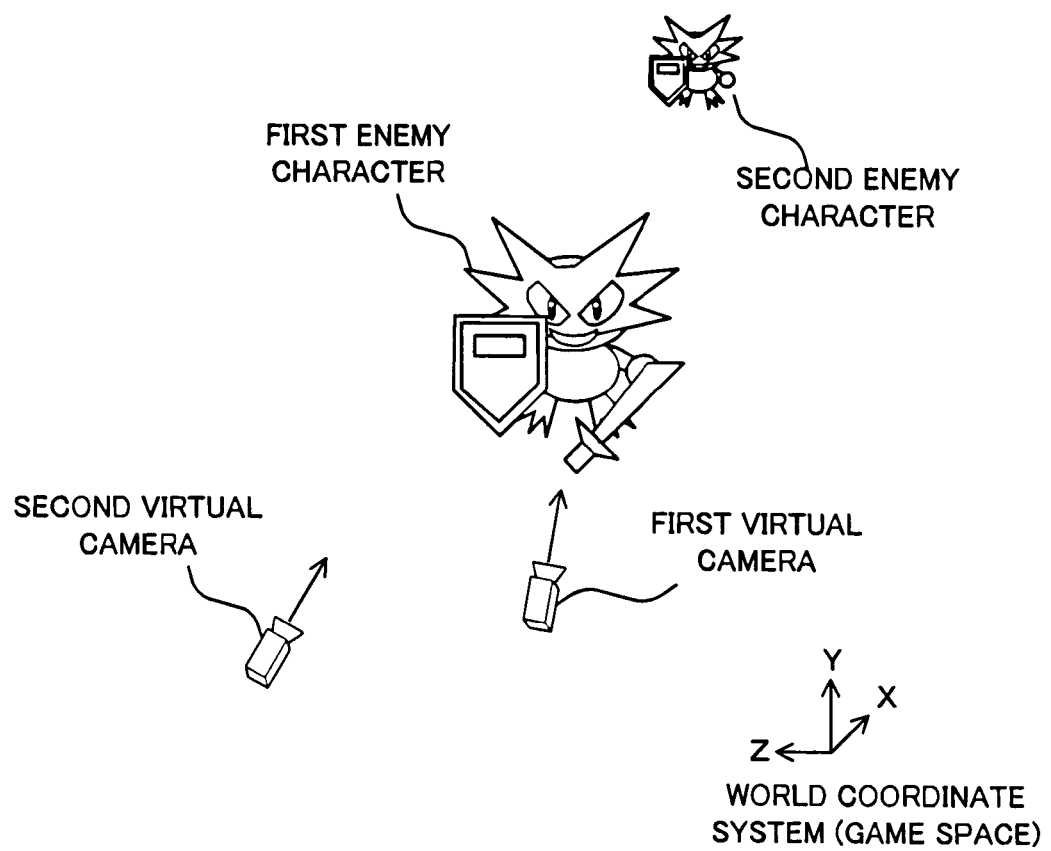
FIG. 14 is an illustration showing one example of a virtual three-dimensional game space.

In the present embodiment, the three-dimensional image processing unit 231 generates a game image representing a state in a virtual three-dimensional game space captured by virtual cameras different for odd-numbered and even-numbered frames. FIG. 14 is an illustration showing one example of the virtual three-dimensional game space. In FIG. 14, this virtual three-dimensional game space has disposed therein a first enemy character and a second enemy character as well as two virtual cameras, that is, a first virtual camera and a second virtual camera. In each odd-numbered frame, the three-dimensional image processing unit 231 generates a game image representing a state in a virtual three-dimensional game space captured by the first virtual camera. In each even-numbered frame, the three-dimensional image processing unit 231 generates a game image representing a state in a virtual three-dimensional game space captured by the second virtual camera. Alternatively, the three-dimensional image processing unit 231 may be provided with a plurality of virtual three-dimensional game spaces for generating, for odd-numbered and even-numbered frame, game images representing different states in the virtual three-dimensional game space.

Figure 15:
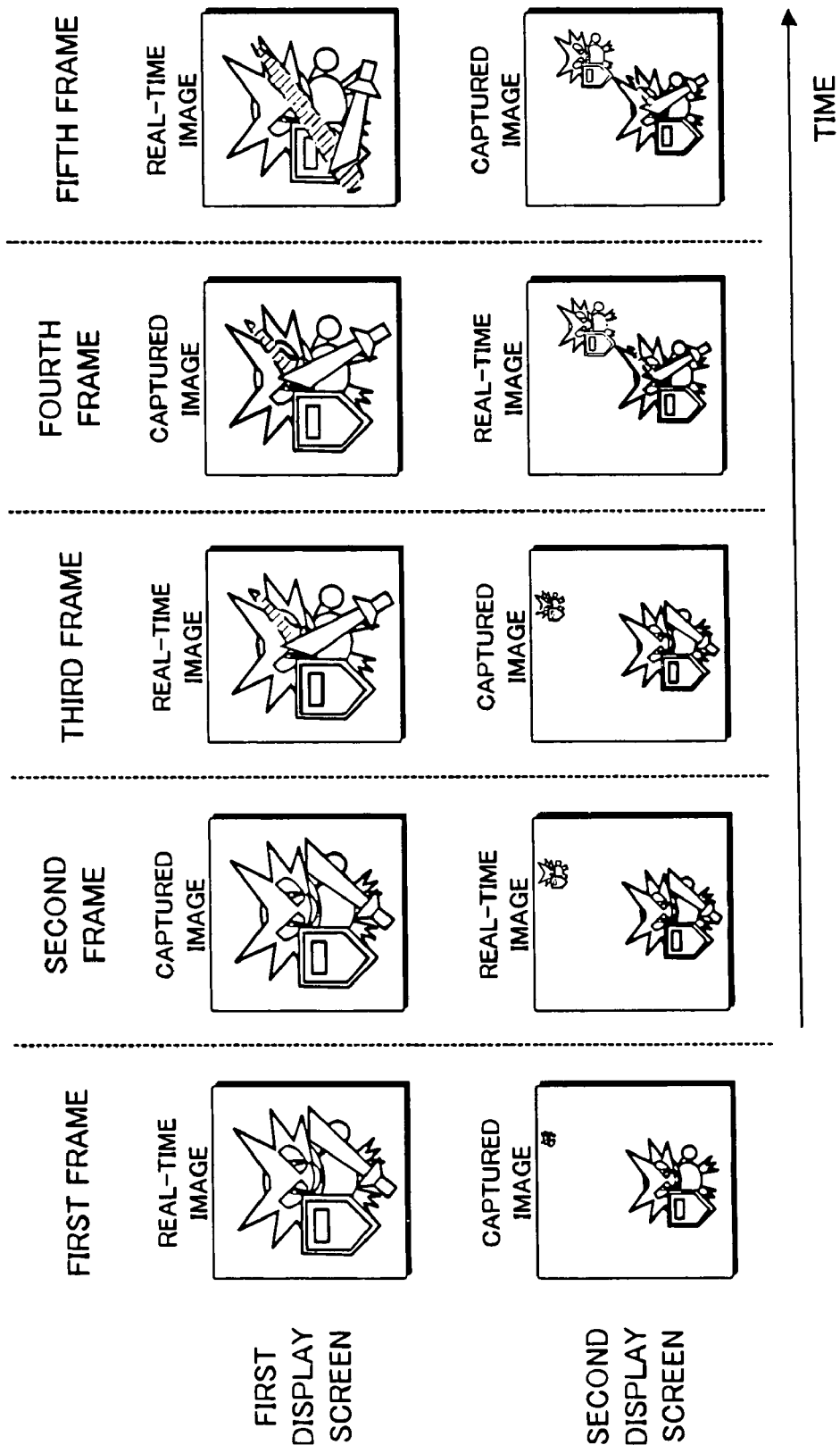

Examples of the game screen displayed on the first display screen 211a and the second display screen 212a based on the above-described operation of the portable game machine 200 are illustrated in FIG. 15. As can be seen from FIG. 15, in each odd-numbered frame, a game image generated in that frame by the three-dimensional image processing unit 231 (such an image is hereinafter referred to as a real-time image) is displayed on the first display screen 211a, while a game image generated in the immediately-preceding frame by the three-dimensional image processing unit 231 then captured by the capture circuit 233 (such an image is hereinafter referred to as a captured image) is displayed on the second display screen 212a. On the other hand, in each even-numbered frame, a game image (real-time image) generated in that frame by the three-dimensional image processing unit 231 is displayed on the second display screen 212a, while a game image (captured image) generated in the immediately-preceding frame by the three-dimensional image processing unit 231 and then captured by the capture circuit 233 is displayed on the first display screen 211a.

As such, in the present embodiment, a real-time image and a captured image are alternately displayed on the first display screen 11a and the second display screen 212a. Then, on the first display screen 211a, a game image representing the state of the virtual three-dimensional game space captured by the first virtual camera is displayed, while on the second display screen 212a, a game image representing the state of the virtual three-dimensional game space captured by the second virtual camera is displayed. Note that, as evident from FIG. 15, game images are displayed for each frame on the first and second display screens 211a and 212a, thereby preventing flicker on the display screens.

Figure 16:
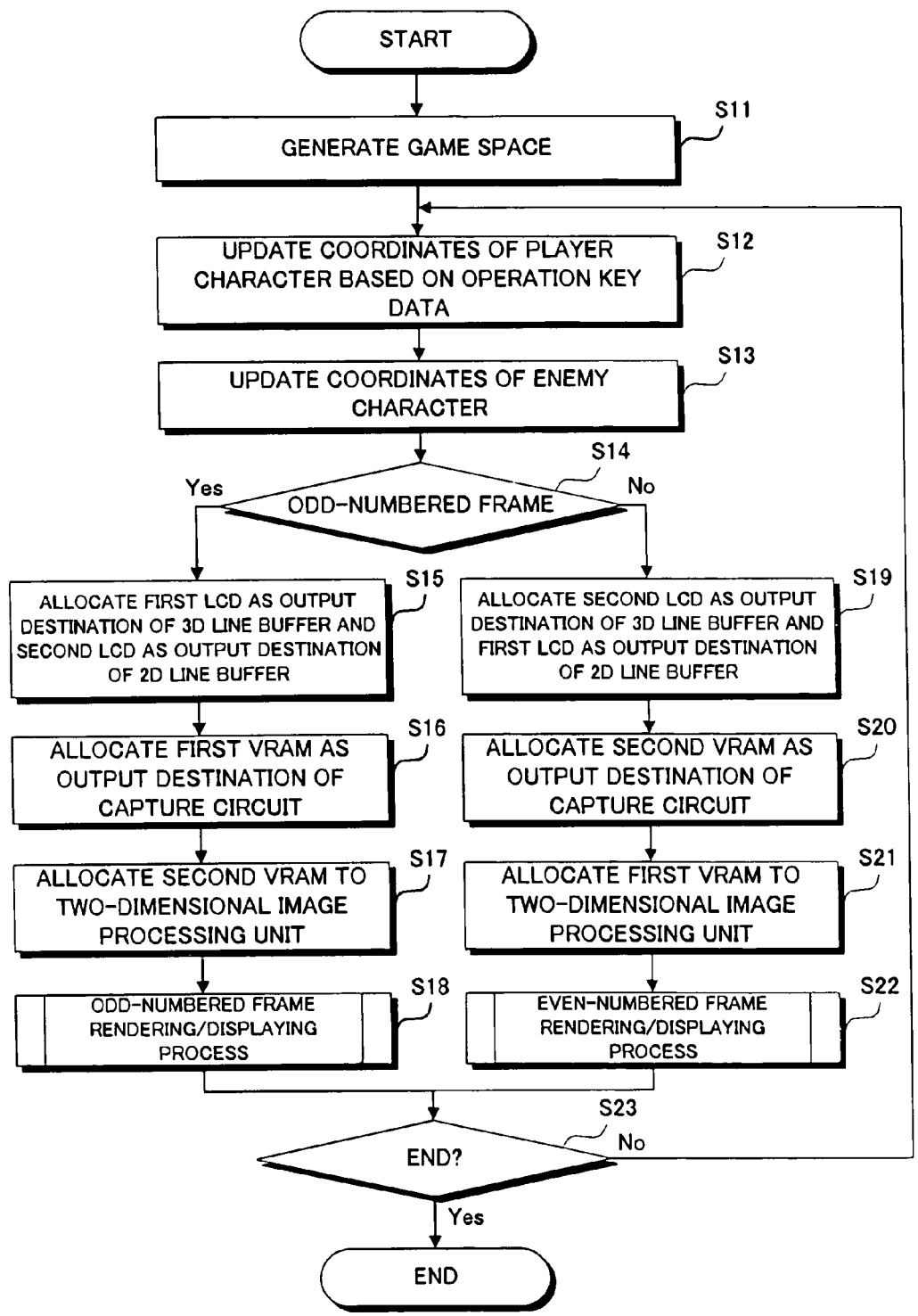
FIG. 16 is a flowchart showing the operation of an illustrative portable game machine.
Figure 17:
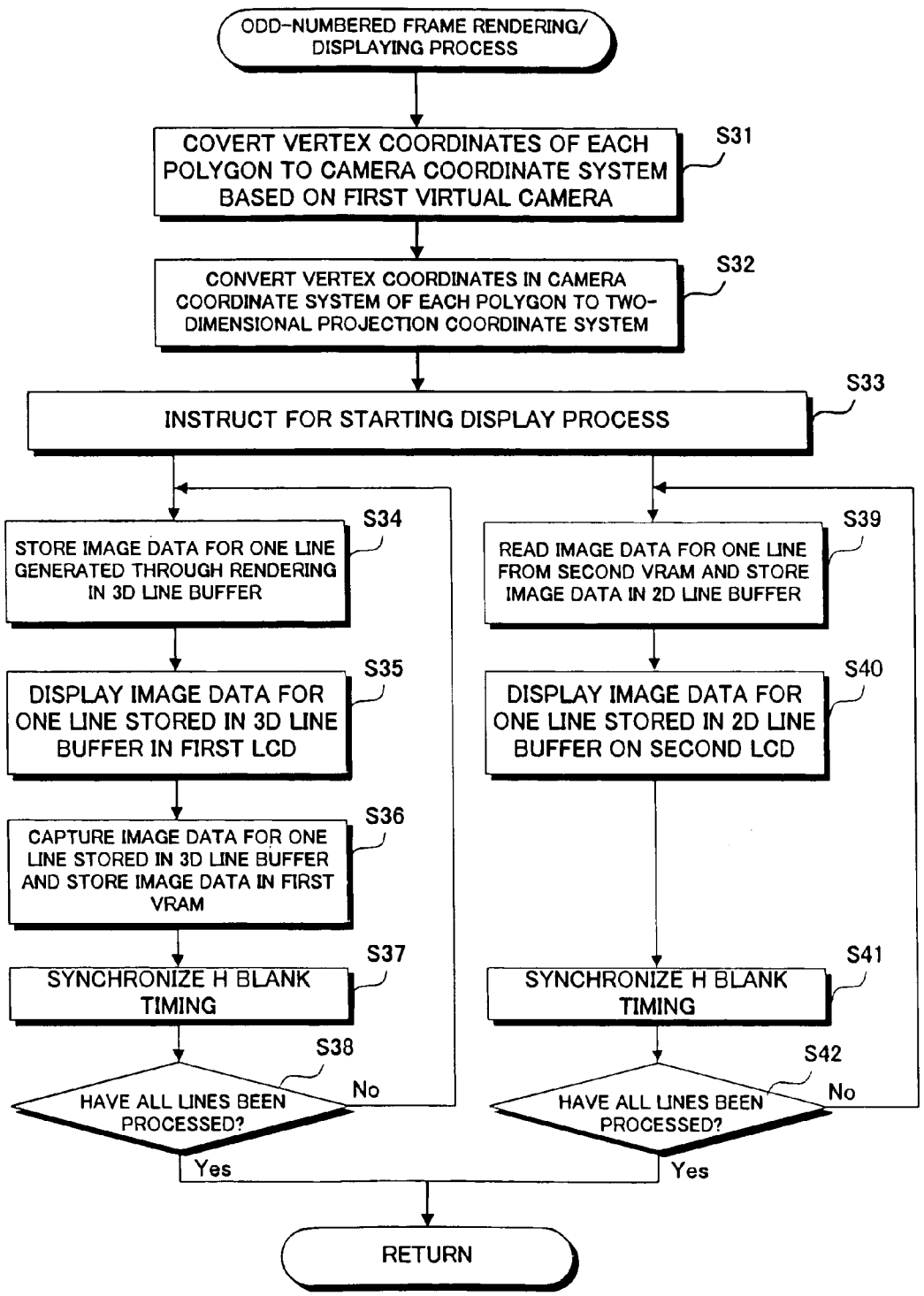
FIG. 17 is a flowchart showing a flow of an odd-numbered frame rendering/displaying process.
Figure 18:
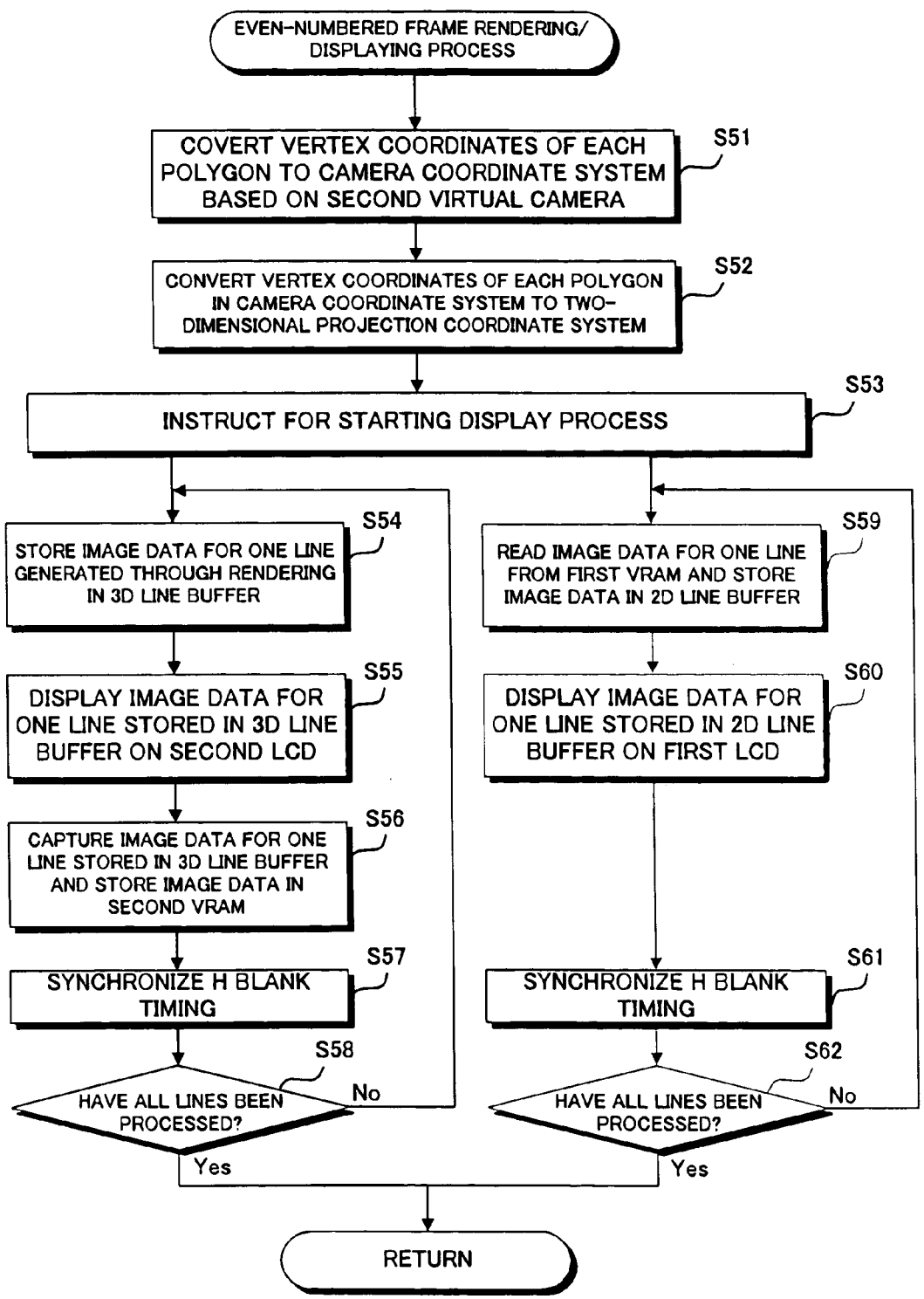
FIG. 18 is a flowchart showing a flow of an even-numbered frame rendering/displaying process.

With reference to FIGS. 16 through 18, the operation of the portable game machine 200 is described in more detail. Here, steps S11 through S17, S19 through S21, and S23 shown in FIG. 16 are described as process steps to be performed in the CPU 223 based on the game program stored in the program ROM 217a of the cartridge 217. However, any of these process steps may be achieved only by hardware.

In FIG. 16, the CPU 223 generates a virtual three-dimensional game space (S11). Specifically, in this process, world coordinates of each vertex of three-dimensional models, such as a player character and enemy characters, formed by a plurality of polygons are set at initial values. Next, based on operation key data output from the operation keys 214, the CPU 223 updates the coordinates of the player character in the virtual three-dimensional game space (S12), and then updates the coordinates of each enemy character in the virtual three-dimensional game space based on a predetermined algorithm (S13).

The CPU 223 then determines whether the current frame is an odd-numbered frame (S14).

When the current frame is an odd-numbered frame, the CPU 223 allocates the first LCD 211 as the output destination of the 3D line buffer 232 and the second LCD 212 as the output destination of the 2D line buffer 238 (S15). Furthermore, the CPU 223 allocates the first VRAM 221*a* as the output destination of the capture circuit 233 (S16), and the second VRAM 221*b* to the two-dimensional image processing unit 237 (S17). Thereafter, an odd-numbered frame rendering/displaying process (S18) is performed, and then the procedure goes to step S23. Details of the odd-numbered frame rendering/displaying process are described further below.

On the other hand, when the current frame is an even-numbered frame, the CPU 223 allocates the second LCD 212 as the output destination of the 3D line buffer 232 and the first LCD 211 as the output destination of the 2D line buffer 238 (S19). Furthermore, the CPU 223 allocates the second VRAM 221*b* as the output destination of the capture circuit (S20) and the first VRAM 221*a* to the two-dimensional image processing unit 237 (S21). Thereafter, an even-numbered frame rendering/displaying process (S22) is performed, and then the procedure goes to step S23. Details of the even-numbered frame rendering/displaying process are described further below.

In step S23, the CPU 223 determines whether the game is over. If the game continues, the procedure returns to step S12. If the game is over, the procedure ends.

Next, the details of the odd-numbered frame rendering/displaying process are described with reference to FIG. 17. The odd-numbered frame rendering/displaying process is performed by the GPU 222 based on instructions from the CPU 223.

First, the geometry engine of the three-dimensional image processing unit 231 converts vertex coordinates (in the world coordinate system) of each polygon in the virtual three-dimensional game space to the two-dimensional projection coordinate system (S32). When conversion of the vertex coordinates of each polygon is completed, an instruction for starting a display process is issued from the GPU 222 to the rendering engine of the three-dimensional image processing unit 231 and the 2D rendering engine of the two-dimensional image processing unit (S33). Upon reception of this instruction, the rendering engine of the three-dimensional image processing unit 231 and the 2D rendering engine of the two-dimensional processing unit concurrently perform their respective processes.

Upon reception of the display process starting instruction, the rendering engine of the three-dimensional image processing unit 231 generates image data for the first one line through a rendering process based on the results of conversions of the vertex coordinates of each polygon, and then stores the generated image data in the 3D line buffer 232 (S34). Then, the image data for one line stored in this 3D line buffer 232 is supplied to the first LCD 211, and is then displayed on the first display screen 211*a* (S35). Also, the image data for one line stored in the 3D line buffer 232 is stored in a predetermined area of the first VRAM 221*a* by the capture circuit 233 (S36). Then, after waiting for an H blank timing (horizontal blanking period) in order to establish horizontal synchronization (S37), the rendering engine performs a process similar to the above for the next line. That is, the rendering engine of the three-dimensional image processing unit 231 generates image data for the next one line, and then stores the generated image data in the 3D line buffer 232 (S34). Thereafter, until all lines have been completely processed (that is, until the entire screen has been completely processed), processes of steps S34 through S37 are repeated.

Upon reception of the display process starting instruction, the 2D rendering engine of the two-dimensional image processing unit 237 reads image data for the first one line of the game image stored in the second VRAM 221*b*, and then stores the read image data in the 2D line buffer 238 (S39). Then, the image data for one line stored in this 2D line buffer 238 is supplied to the second LCD 212, and is then displayed on the second display screen 212*a* (S40). Then, after waiting for an H blank timing (horizontal blanking period) in order to establish horizontal synchronization (S41), the 2D rendering engine performs a process similar to the above. That is, the 2D rendering engine of the two-dimensional image processing unit 237 reads image data for the next one line from the second VRAM 221*b*, and then stores the read image data in the 2D line buffer 238 (S39). Thereafter, until all lines have been completely processed (that is, until the entire screen has been completely processed), processes of steps S39 through S41 are repeated.

When all lines have been completely processed by the rendering engine of the three-dimensional image processing unit 231 and the 2D rendering engine of the two-dimensional image processing unit 237, the odd-numbered frame rendering/displaying process ends.

Next, the details of the even-numbered frame rendering/displaying process are described with reference to FIG. 18. This even-numbered rendering/displaying process is performed by the GPU 222 based on instructions from the CPU 223.

First, the geometry engine of the three-dimensional image processing unit 231 converts vertex coordinates (in the world coordinate system) of each polygon in the virtual three-dimensional game space to the camera coordinate system (S51). Furthermore, the geometry engine of the three-dimensional image processing unit 231 converts these vertex coordinates (in the camera coordinate system) to the two-dimensional projection coordinate system (S52). When conversion of the vertex coordinates of each polygon is completed, an instruction for starting a display process is issued from the GPU 222 to the rendering engine of the three-dimensional image processing unit 231 and the 2D rendering engine of the two-dimensional image processing unit (S53). Upon reception of this instruction, the rendering engine of the three-dimensional image processing unit 231 and the 2D rendering engine of the two-dimensional processing unit concurrently perform their respective processes.

Upon reception of the display process starting instruction, the rendering engine of the three-dimensional image processing unit 231 generates image data for the first one line through a rendering process based on the results of conversions of the vertex coordinates of each polygon, and then stores the generated image data in the 3D line buffer 232 (S54). Then, the image data for one line stored in this 3D line buffer 232 is supplied to the second LCD 212, and is then displayed on the second display screen 212*a* (S55). Also, the image data for one line stored in the 3D line buffer 232 is stored in a predetermined area of the second VRAM 221*b* by the capture circuit 233 (S56). Then, after waiting for an H blank timing (horizontal blanking period) in order to establish horizontal synchronization (S57), the rendering engine performs a process similar to the above for the next line. That is, the rendering engine of the three-dimensional image processing unit 231 generates image data for the next one line, and then stores the generated image data in the 3D line buffer 232 (S54). Thereafter, until all lines have been completely processed (that is, until the entire screen has been completely processed), processes of steps S54 through S7 are repeated.

Upon reception of the display process starting instruction, the 2D rendering engine of the two-dimensional image processing unit 237 reads image data for the first one line of the game image stored in the first VRAM 221*a*, and then stores the read image data in the 2D line buffer 238 (S59). Then, the image data for one line stored in this 2D line buffer 238 is supplied to the first LCD 211, and is then displayed on the first display screen 211a (S60). Then, after waiting for an H blank timing (horizontal blanking period) in order to establish horizontal synchronization (S61), the 2D rendering engine performs a process similar to the above. That is, the 2D rendering engine of the two-dimensional image processing unit 237 reads image data for the next one line from the first VRAM 221a, and then stores the read image data in the 2D line buffer 238 (S59). Thereafter, until all lines have been completely processed (that is, until the entire screen has been completely processed), processes of steps S59 through S61 are repeated.

When all lines have been completely processed by the rendering engine of the three-dimensional image processing unit 231 and the 2D rendering engine of the two-dimensional image processing unit 237, the even-numbered frame rendering/displaying process ends.

As described above, according to the portable game machine 200 of the present embodiment, by using the single three-dimensional image processing unit 231, different three-dimensional game images can be simultaneously displayed on the first LCD 211 and the second LCD 212 without flicker on the display screens.

Figure 19:
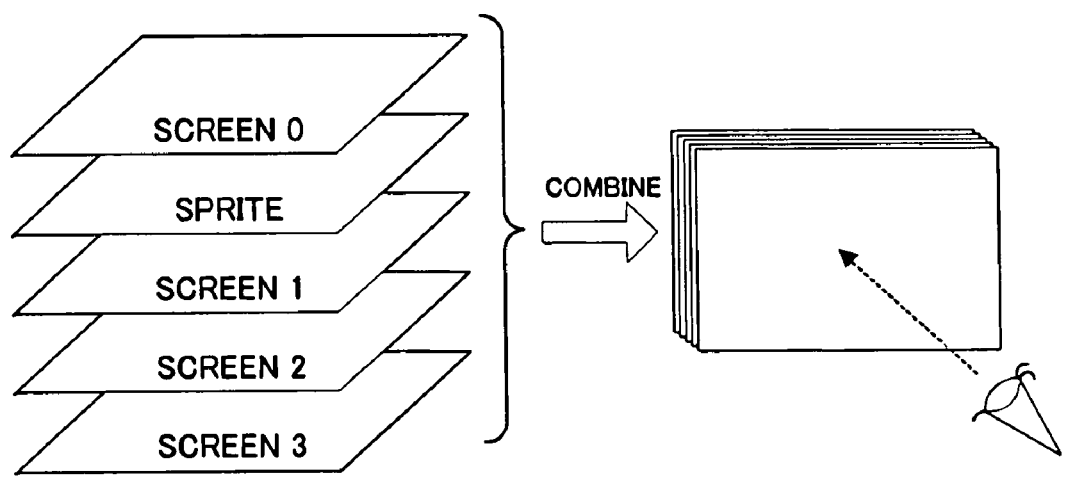
FIG. 19 is an illustration showing an original two-dimensional game image generating process to be performed by a two-dimensional image processing unit 37.
Figure 20:
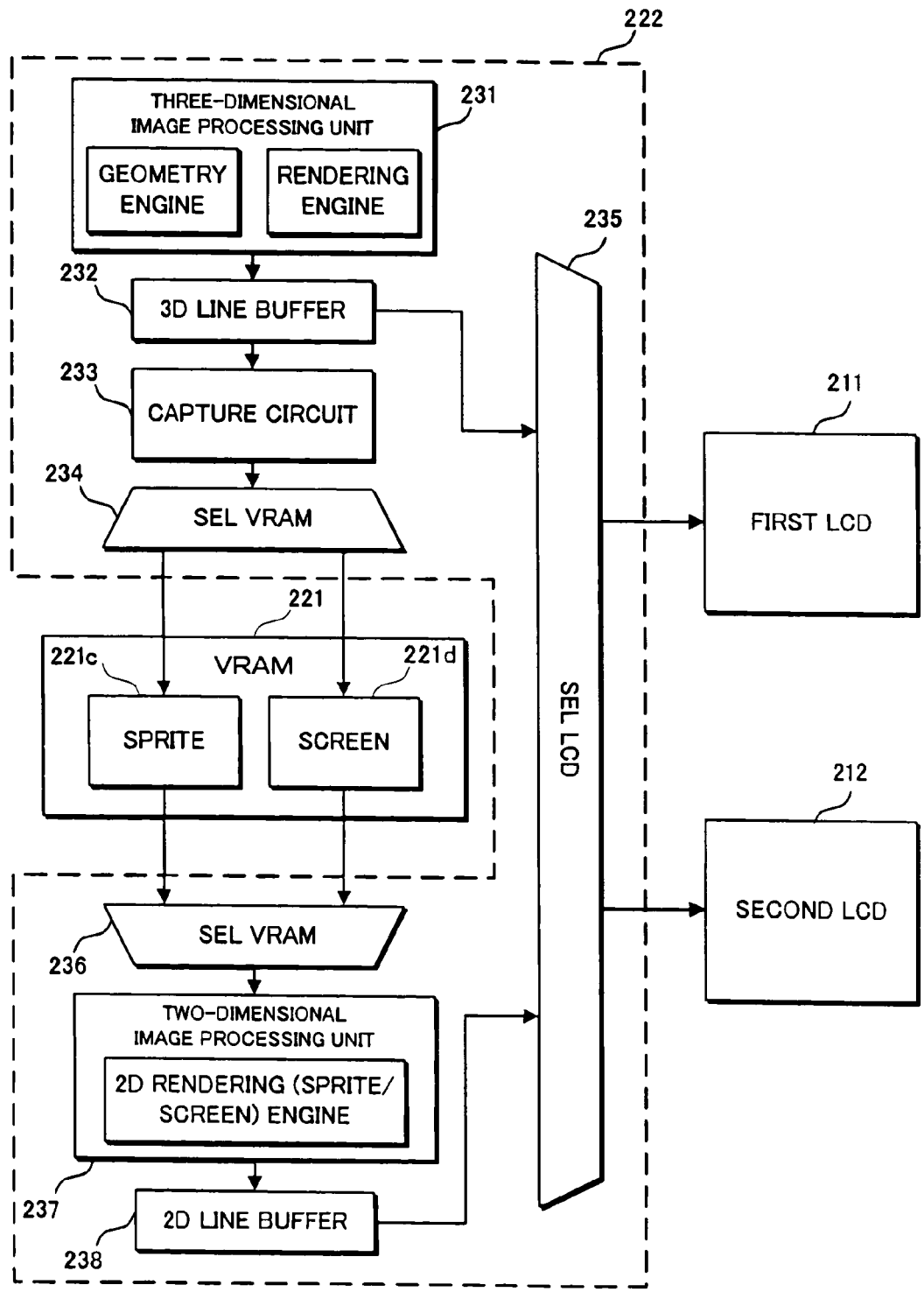
FIG. 20 is an illustration showing an internal configuration of a GPU 22 according to an exemplary modification of the present invention.

As described above, when generating a normal two-dimensional game image, the two-dimensional image processing unit 237 disposes a two-dimensional image representing a character on the virtual screen called a "sprite" and a two-dimensional image representing a background on the virtual screen called a "screen", and then synthesizes these virtual screens to generate a game image to be eventually displayed. There might be the case where a plurality of "screens" are present. FIG. 19 shows an example in which five virtual screens, that is, a sprite and screens 0 through 3, are synthesized to form a two-dimensional game image. As an exemplary modification of the present embodiment, any two of these virtual screens can be used in place of the first VRAM 221a and the second VRAM 221b. The structure of the portable game machine 200 in that case is exemplarily shown in FIG. 20. In the example of FIG. 20, a sprite area 221c and a screen area 221d are used in place of the first VRAM 221a and the second VRAM 221b. Hereinafter, the operation in the exemplary modification is briefly described.

The capture circuit 233 stores the game image captured in each odd-numbered frame in the sprite area 221c of the VRAM 221 and the game image captured in each even-numbered frame in the screen area 221d of the VRAM 221. When generating a normal two-dimensional game image, the two-dimensional image processing unit 237 generates a two-dimensional game image formed by synthesizing the "sprite" and the "screen" and then outputs the generated image to the 2D line buffer 238. In the exemplary modification, however, in each odd-numbered frame, the two-dimensional image processing unit 237 generates a game image formed of only the "screen", and then outputs the generated game image via the 2D line buffer 238 to the second LCD 212. In each even-numbered frame, the two-dimensional image processing unit 237 generates a game image formed of only the "sprite", and then outputs the generated game image via the 2D line buffer 238 to the first LCD 211. As a result, game images similar to those shown in FIG. 15 are displayed on the first display screen 211a and the second display screen 212a.

As such, selecting a desired virtual screen from a plurality of virtual screens for display is a function originally provided to the two-dimensional image processing unit 237. Therefore, no special function has to be added to the two-dimensional image processing unit. Also, an additional storage area for temporarily storing the game image captured by the capture circuit 233 is not required, thereby suppressing cost required for the portable game machine 200.

As one embodiment of the present invention, the portable game machine having a hardware structure as shown in FIGS. 10 and 11 has been described. However, the present invention is applied not only to the portable game machine having such a hardware structure, but to the one having the above hardware structure achieved by the CPU and software. Also, the portable game machine according to the present embodiment can be emulated by a computer system, such as a personal computer or a portable information terminal. In this case, a game program that causes the computer system to achieve each hardware function of the portable game machine according to the present embodiment is supplied to the computer system. With this, the present invention can be applied also to a general-purpose computer system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A portable, handheld device comprising:
a main body incorporating a first display screen on an inner face of said main body, and a second body incorporating a second display screen on an inner face of said second body, said main body being coupled to said second body;
wherein said main body is provided with a first input device located on a first side of the first display screen and a second input device located on a second side of the first display screen that is opposite the first side, wherein at least one of the first and second input devices allow a user to provide directional inputs in at least two different axes; and
image processing circuitry for simultaneously displaying different images on said first display screen and said second display screen, wherein at least one of said images is a three-dimensional image.

2. A portable hand-held device according to claim 1, wherein said image processing circuitry includes
a three-dimensional image processing unit which generates a first game image based on three-dimensional model data for each of a plurality of frames;
a capture circuit which captures the first game image generated by the three-dimensional image processing unit as two-dimensional image data;
storage locations that store the two-dimensional image data captured by the capture circuit;
a two-dimensional image processing unit which generates a second game image based on two-dimensional image data in a previous frame already stored in the storage locations; and
an output destination setting circuit which sets one of the first display and the second display as an output destination of the first game image and another one of the first display and the second display as an output destination of the second game image.

3. The portable handheld device according to claim 2, wherein the output destination setting circuit can switch the destinations for the first game image and the second game image based on user input.

4. The portable, handheld device of claim 1 wherein said main body further comprises a memory slot.

5. The portable, handheld device of claim 4 wherein said memory slot comprises a memory slot configured to receive a first type of memory card having first dimensions, and further comprising a second memory slot configured to receive a second type of memory card having second dimensions that are different from the first dimensions.

6. The portable, handheld device of claim 1 wherein said first display screen comprises a touch-sensitive display screen.

7. The portable, handheld device of claim 6 further including a stylus port.

8. The portable, handheld device of claim 1, wherein at least one of the first and second input devices allow a user to provide directional inputs in two mutually perpendicular directions.

9. The portable, handheld device of claim 1, wherein at least one of the first and second input devices comprises a cross-key.

10. The portable, handheld device of claim 1, wherein at least one of the first and second input devices comprises a cross-shaped arrangement of control buttons.

11. The portable, handheld device of claim 1, wherein one of the first and second input devices comprises a cross-key, and wherein the other of the first and second input devices comprises a cross-shaped arrangement of control buttons.

12. The portable, handheld device of claim 1, wherein additional control buttons are located in a rearward portion of a peripheral edge surrounding the main body.

13. The portable, handheld device of claim 12, wherein the additional control buttons are provided on opposite sides of the peripheral edge of the main body.

14. The portable, handheld device of claim 1, further comprising a pair of speakers mounted on the second body, wherein the speakers are mounted on opposite sides of the second display screen.

15. The portable, handheld device of claim 1, wherein the second body is coupled to the main body such that the second body can be folded relative to the main body between an open position in which the first and second display screens are exposed and visible to a user, and a closed position in which the first display screen is covered by the second body.

16. The portable handheld device according to claim 1, wherein at least one of the first and second input devices comprises a sliding input device.

17. The portable handheld device according to claim 1, wherein both the first and second input devices allow a user to provide directional inputs in at least two different axes.

18. A handheld device comprising:
a first body incorporating a first display screen;
a second body that is foldably coupled to the first body and that incorporates a second display screen, the second body being movable between an open position where the first and second display screens are visible to a user and a closed position where the first and second display screens are not visible;
said main body being provided with a first input device located on a first side of the first display screen and a second input device located on a second side of the first display screen that is opposite the first side, the first and second input devices being located such that when a user supports the first and second bodies in free space using both hands, a finger or thumb of the user's first hand can operate the first input device and a finger or thumb of the user's second hand can operate the second input device;
first and second control buttons provided on a peripheral edge of at least one of the first and second bodies, the first and second control buttons being located such that when a user supports the first and second bodies in free space using both hands, a finger of the user's first hand can operate the first control button and a finger of the user's second hand can operate the second control button; and
image processing circuitry for simultaneously displaying first and second images on said first and second display screens, wherein at least one of said first and second images is a three-dimensional image.

19. The handheld device of claim 18, wherein the image processing circuitry can display the first image on either of the first and second display screens, and wherein the image processing circuitry can display either of the first and second images on the second display screen.

20. The handheld device of claim 19, wherein the image processing circuitry can switch the first image from the first display screen to the second display screen and the second image from the second display screen to the first display screen, and vice versa, based on user input.

21. The handheld device of claim 18, wherein at least one of the first and second display screens is a touch sensitive display screen structured to receive user input.

22. The handheld device of claim 18, wherein one of the first and second input devices is structured to slide in at least one axial direction, and wherein the other of the first and second input devices comprises an arrangement of at least three input buttons that are not aligned along a single axis.

23. The handheld device of claim 18, wherein one of the first and second input devices is structured to receive directional input in at least two different axes, and wherein the other of the first and second input devices comprises an arrangement of at least three input buttons that are not aligned along a single axis.

24. A handheld device comprising:
a first body incorporating a first display screen;
a second body that is foldably coupled to the first body and that incorporates a second display screen;
said main body being provided with a slidable input device located on a side of the first display screen, the slidable input device being located such that when a user supports the first and second bodies in free space using at least one hand, a finger or thumb of the user hand can operate the slidable input device;
first and second control buttons provided on opposite sides of a rearward peripheral edge of at least one of the first and second bodies; and
image processing circuitry operatively coupled to the first and second display screens that causes first and second images to be displayed on said first and second display screens, wherein at least one of said first and second images is a three-dimensional image, and wherein the image processing circuitry can display either of the first and second images on either of the first and second display screens based on user input.

25. The handheld device of claim 24, wherein the first and second control buttons are located such that when a user supports the first and second bodies in free space using both hands, a finger of the user's first hand can operate the first control button and a finger of the user's second hand can operate the second control button.

26. The handheld device of claim 24, wherein the main body further includes an arrangement of at least three input buttons that are not aligned along a single axis.

27. The handheld device of claim 24, wherein the main body further includes an arrangement of at least four input buttons that are located on the main body such that the user can depress selected ones of the at least four input buttons to provide directional inputs in at least two different axes.

28. The handheld device of claim 27, wherein the slidable input device and the arrangement of at least four input buttons are located on the first body such that when a user supports the first and second bodies in free space using both hands, a finger or thumb of the user's first hand can operate the slidable input device and a finger or thumb of the user's second hand can operate any of the at least four input buttons.

29. A handheld device comprising:
a first body incorporating a first display screen;
a second body that is foldably coupled to the first body and that incorporates a second display screen, wherein at least one of the first and second display screens is a touch sensitive display screen;
said first body being provided with a first input device located on a first side of the first display screen, and a second input device located on a second side of the display screen, wherein both the first and second input devices allow a user to provide directional inputs in two different axes;
first and second control buttons provided on opposite sides of a rearward peripheral edge of at least one of the first and second bodies, the first and second control buttons being located such that when a user supports the first and second bodies in free space using both hands, a finger of the user's first hand can operate the first control button and a finger of the user's second hand can operate the second control button; and
image processing circuitry operatively coupled to the first and second display screens that is configured to cause first and second images to be simultaneously displayed on the first and second display screens, respectively.

30. The handheld device according to claim 29, wherein the image processing circuitry is configured to cause first and second three dimensional images to be displayed on the first and second display screens.

31. The handheld device according to claim 29, wherein the image processing circuitry is configured to cause a first three dimensional image taken from the perspective of a first virtual camera in a virtual game space to be displayed on one of the first and second display screens, and wherein the image processing circuitry is also configured to cause a second three dimensional image taken from the perspective of a second virtual camera in the virtual game space to be displayed on the other of the first and second display screens.

32. The handheld device according to claim 31, wherein the image processing circuitry can display either of the first and second images on either of the first and second display screens based on user input.

33. The handheld device according to claim 29, further comprising first and second speakers on the second body that are located on opposite sides of the second display screen.

34. A handheld device comprising:
a first body incorporating a first display screen;
a second body that is foldably coupled to the first body and that incorporates a second display screen;
said first body being provided with a first input device located on a first side of the first display screen, and a second input device located on a second side of the display screen; and
an image processing unit that is configured to cause a first three dimensional image representing a first view of a virtual game space taken from the perspective of a first virtual camera to be displayed on one of the first and second display screens, and wherein the image processing unit is also configured to cause a second three dimensional image representing a second view of the virtual game space taken from the perspective of a second virtual camera to be simultaneously displayed on the other of the first and second display screens.

35. The handheld device according to claim 34, further comprising first and second control buttons provided on opposite sides of a rearward peripheral edge of at least one of the first and second bodies.

36. The handheld device according to claim 35, wherein the first and second input devices and the first and second control buttons are located such that when a user supports the first and second bodies in free space using both hands, a finger or thumb of the user's first hand can operate the first input device, a finger of the user's first hand can operate the first control button, a finger or thumb of the user's second hand can operate the second input device, and a finger of the user's second hand can operate the second control button.

37. The handheld device according to claim 34, wherein both the first and second input devices allow a user to provide directional inputs in two different axes.

38. The handheld device according to claim 34, wherein at least one of the first and second display screens is a touch sensitive display screen.

39. The handheld device according to claim 34, wherein at least one of the first and second input devices comprises at least three input buttons that are not arranged along a single axis.

* * * * *